(12) United States Patent
Hansl et al.

(10) Patent No.: US 7,281,608 B2
(45) Date of Patent: Oct. 16, 2007

(54) LOADING/UNLOADING DEVICE FOR SHELVING

(75) Inventors: Rudolf Hansl, Altmünster (AT); Thomas Schwingshandl, Pasching (AT); Wolfgang Ensinger, Buchkirchen (AT); Herbert Aschauer, Weisskirchen (AT)

(73) Assignee: TGW Transportgeräte GmbH, Wels (AT)

( * ) Notice: Subject to any disclaimer, the term of this patent is extended or adjusted under 35 U.S.C. 154(b) by 606 days.

(21) Appl. No.: 10/479,699

(22) PCT Filed: May 29, 2002

(86) PCT No.: PCT/AT02/00164

§ 371 (c)(1),
(2), (4) Date: Jun. 14, 2004

(87) PCT Pub. No.: WO02/100759

PCT Pub. Date: Dec. 19, 2002

(65) Prior Publication Data

US 2004/0216957 A1 Nov. 4, 2004

(30) Foreign Application Priority Data

Jun. 13, 2001 (AT) .............................. A 925/2001
Apr. 12, 2002 (AT) .............................. A 575/2002

(51) Int. Cl.
*B65G 1/04* (2006.01)
*B66C 19/00* (2006.01)
*B66F 9/07* (2006.01)

(52) U.S. Cl. ...................... 187/226; 187/406; 187/262; 414/277; 414/278; 414/279; 198/347.1

(58) Field of Classification Search ................ 414/277, 414/281, 244, 282, 278, 279; 187/244, 406, 187/226, 235, 238, 262; 198/347.1
See application file for complete search history.

(56) References Cited

U.S. PATENT DOCUMENTS 2,696,763 A * 12/1954 Daugherty et al. ......... 409/237

(Continued)

FOREIGN PATENT DOCUMENTS

CH          518 862         3/1972

(Continued)

*Primary Examiner*—Lincoln Donovan
*Assistant Examiner*—Eduardo Colon Santana
(74) *Attorney, Agent, or Firm*—Collard & Roe, P.C.

(57) ABSTRACT

The invention relates to a rack serving device (1) with a load-bearing means (4) displaceable in the height direction of a mast (2), the mast (2) being guided by means of bogie assemblies (7, 8) on bottom and top guide tracks and mounted so as to be displaceable along the guide tracks by means of a bottom and top friction-locking displacement drive (13, 14). The bottom and the top adjusting mechanisms are guided by means of height and lateral guide elements on the guide track and are designed to be displaceable relative to the guide tracks by means of a drive system (33). Arranged respectively between the displacement drives (13, 14) and bogie assemblies (7, 8) is a coupling mechanism (29), comprising at least two displaceable coupling parts (28) and, extending between the articulation axes of the coupling parts (28), at least one coupling connection (27) which is pivotable about the articulation axis substantially perpendicular to the longitudinal extension of the guide track relative to a coupling part (28) and, at an end region remote from this articulation axis, mounted so as to be slideable in a longitudinal guide extending substantially parallel with the longitudinal extension of the mast (2).

61 Claims, 10 Drawing Sheets

U.S. PATENT DOCUMENTS

| | | | |
|---|---|---|---|
| 3,631,940 A * | 1/1972 | Richins | 182/148 |
| 4,658,485 A | 4/1987 | Yang | |
| 4,721,043 A * | 1/1988 | Pudney et al. | 104/121 |
| 4,919,056 A * | 4/1990 | Gronau | 104/130.07 |
| 5,033,784 A | 7/1991 | Martin | |
| 6,467,582 B1 * | 10/2002 | Nakashima et al. | 187/244 |
| 6,571,970 B1 * | 6/2003 | Spoeler et al. | 212/333 |
| 6,824,345 B2 * | 11/2004 | Hansl et al. | 414/282 |
| 2004/0126210 A1 * | 7/2004 | Hansl et al. | 414/281 |
| 2006/0285947 A1 * | 12/2006 | Hansl et al. | 414/277 |

FOREIGN PATENT DOCUMENTS

| | | |
|---|---|---|
| CH | 518 863 | 3/1972 |
| DE | 14 77 603 | 6/1969 |
| DE | 34 43 315 | 8/1985 |
| DE | 44 08 123 | 9/1994 |
| DE | 44 05 952 | 11/1994 |
| DE | 195 34 291 | 3/1997 |
| DE | 196 14 660 | 10/1997 |
| EP | 0621 231 | 10/1994 |
| GB | 2264292 A * | 8/1993 |
| WO | WO89/12592 | 12/1989 |

* cited by examiner

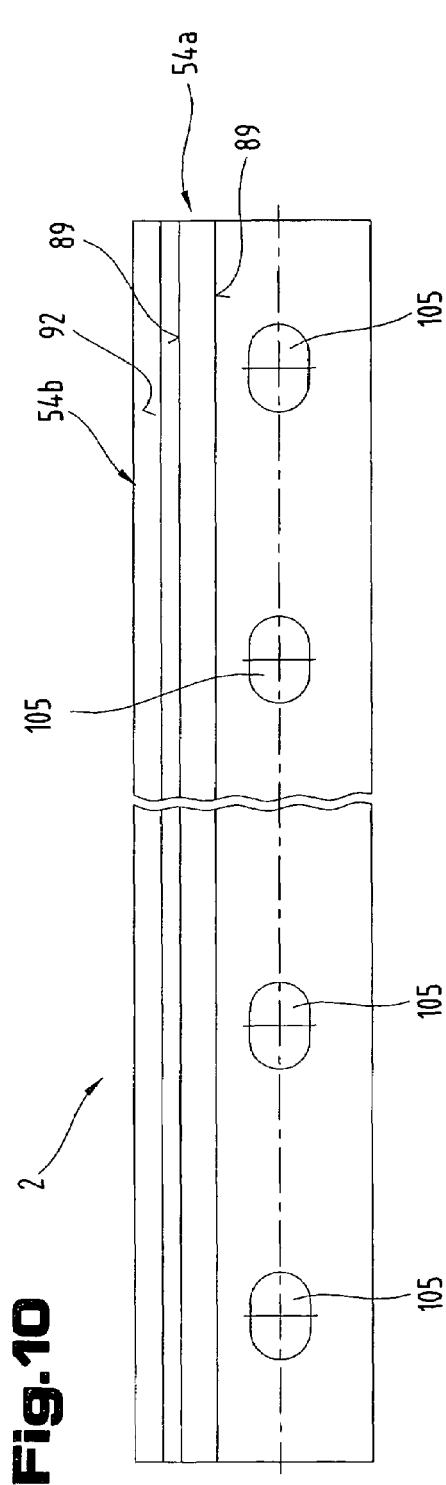
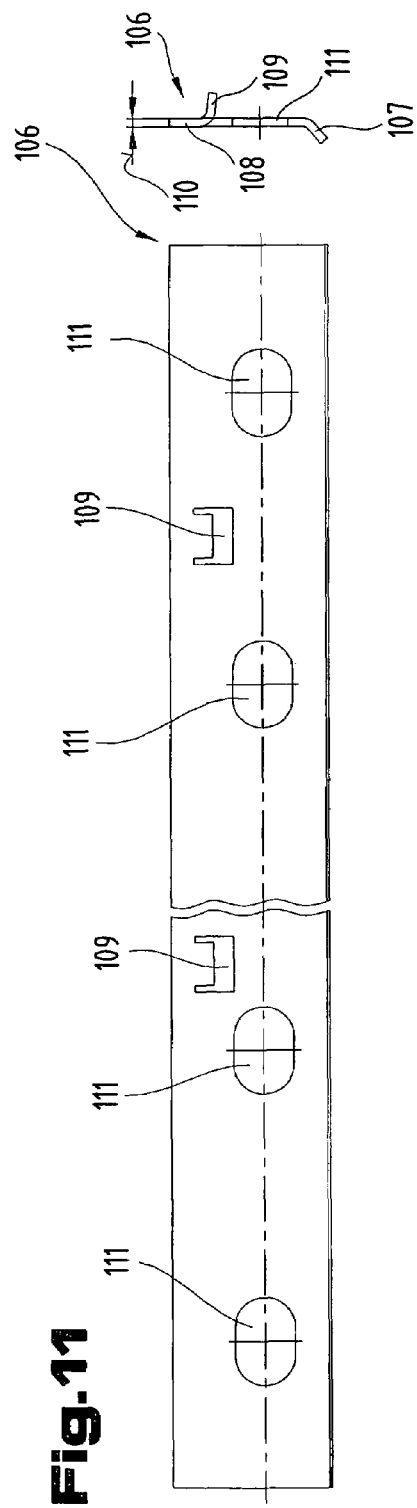

LOADING/UNLOADING DEVICE FOR SHELVING

CROSS REFERENCE TO RELATED APPLICATIONS

Applicants claim priority under 35 U.S.C. §119 of AUSTRIAN Application No. A 925/2001 filed on Jun. 13, 2001 and AUSTRIAN Application No. A 575/2002 filed on Apr. 12, 2002. Applicants also claim priority under 35 U.S.C. §365 of PCT/AT02/00164 filed on May 29, 2002. The international application under PCT article 21(2)was not published in English.

BACKGROUND OF THE INVENTION

1. Field of the Invention

The invention relates to a rack serving device with a lift carriage.

2. Description of the Related Art

A number of different rack serving devices are known, which essentially differ in terms of the layout of the drives and the structural design of the mast, namely depending on whether they are single-mast or twin-mast systems.

Patent specification DE 44 05 952 A1 describes a rack serving device, which is displaced by means of top and bottom drives, the travel of which is controlled in synchronisation. The rack serving device is guided in an aisle and a lift carriage on its mast carries the loads. The rack serving device transmits its own natural weight and the weight of the loads to be carried via a roller with runs along with it in the aisle. In another embodiment of this invention, the mast is supported at the top and bottom region in the direction of the aisle by means of driven gear wheels in stationary gear racks. The synchronised motion is achieved either by electrical synchronisation or by mechanically coupling the two drives. The mast foot and mast head are held vertical one above the other by taking separate measurements of the travel paths and applying a permanent compensation for any deviations by accelerating or decelerating at least one displacement drive. The disadvantage of this rack serving device is the risk of the rack and pinion drive being forced due to misalignment of the mast if the electric synchronisation fails. The uneven moment of inertia of the mast foot and mast head depending on the position of the lift carriage means that greater differences in the braking path between bottom and top traction drives can be expected, and hence misalignment of the mast. In the case of this particular rack serving device, this causes a strong pressure on the sides of the meshing teeth of the rack and pinion drive, which can lead to damage.

Patent specification EP 0 621 231 A1 discloses a rack serving device similar to the one described above, in which the driven gears of the synchronously rotated drives are mounted on universal joints in order to compensate for angular errors and avoid forced pressure.

The same systems with drives acting in a friction lock are also already known from patent specifications CH 518 862 and CH 518 863. The mast is guided on guide rails by means of guide rollers mounted laterally at the mast foot and mast head and is supported in a friction lock in the direction of travel by means of two pinions of a vertical connecting shaft in a respective top and bottom gear rack. The rack serving device transmits the vertical forces into the bottom rail via a flywheel. Since the mast foot and mast head are forcibly guided, there is no need to make allowance for a horizontal gear distance. The disadvantage of this rack serving device is the highly complex mechanical system needed for the connecting shaft and its mounting on the mast, as well as the very high costs incurred by the top and bottom gear rack and their accurate laying in the aisle of the racking system. Furthermore, this rack serving device is susceptible to barely controllable vibrations under dynamic load because the extremely long connecting shaft is very easily twisted and acts like a torsion spring under dynamic influences.

The rack serving devices above known from patent specifications DE 44 05 052 A1, EP 0 621 231 A1, CH 518 862 and CH 518 863 also have problems in terms of noise, lubrication and wear due to the open construction of the teeth and the relatively high cost of the materials, assembly and maintenance. The high build-up of noise also means that the rack serving devices described above can be used on a limited basis only. The various disadvantages outlined above are so serious that these rack serving devices have not been able to gain a foothold on the market to date.

The above-mentioned disadvantages have been overcome by using drives which act on the basis of a friction-locking action. A drive of this type for a rack serving device is known from patent specification DE 44 08 123 A1, which has a drive which can be driven on at least one floor rail and at least one, but as a rule two, load-bearing wheels supported on the floor rail. The load-bearing wheels merely take the load of the entire rack serving device and the driving torque is transmitted to the bogie assembly of the rack serving device by at least one separate friction wheel, which engages on the web of the floor rail. The rails are provided in the form of double-T sections or T-sections, the web of which stands perpendicular to the ground on which the rail is laid and fixed and the load-bearing wheel is supported and rolls on the top and bottom belt of the rails, whilst the friction wheel engages on the web. The friction wheels are forced against the web with a pre-definable contact force. This contact force can be manually set or automatically controlled by means of a runner. The disadvantage of this is that the drive rollers are disposed and roll on oppositely lying guide rails of the web and also serve as lateral guide members for the bogie assembly frame incorporating the drive. If a mast of a rack serving device of this type is fitted with a bogie assembly driven in this manner at its mast foot and mast head and the mast moves out of line from its vertical orientation and/or is subjected to forces acting in the transverse direction to the aisle, the drive rollers will be subjected to increased friction-induced wear, which means that these bogie assemblies can only be used on rack serving devices of a small construction and operated at low displacement speeds. For this reason alone, the range of applications for which rack serving devices fitted with these bogie assemblies can be used is severely limited and they could not be used, or could be used under limited conditions only, for modern order picking systems where travel speeds of up to 7 m/sec and mast heights of up to 20 m as well as low maintenance are required. The deformation occurring caused in the mast during operation alone causes stress on the drive rollers and the increased friction-induced wear mentioned above.

Patent specifications DE 195 34 291 A1 and DE 196 14 660 A1 propose rack serving devices which largely overcome the disadvantages outlined above. These rack serving devices have one mast with a lift carriage which can be displaced on it, which is guided and supported by means of a bogie assembly on the bottom and top rail disposed at the mast foot and mast head, each of which is fitted with a drive. The mast foot and mast head are respectively secured to the bottom and top driven bogie assembly on an articulated bearing, each bogie assembly having two driveable load-bearing wheels acting by means of a friction lock, which sit one behind the other on either side of the articulated bearing so that they can roll on mutually facing top and bottom belts of the bottom and top rails. The load-bearing wheels co-operate with follower rollers which can be applied on opposing sides of the top and bottom belt in order to improve adhesion between the load-bearing wheels and rails. The load-bearing wheels and follower rollers are made from plastic, in particular an elastomer. The disadvantage of rack serving devices of this type is that the driveable wheels are designed to transmit a forward motion to the bogie assembly in the direction of the aisle on the one hand and to take the natural weight of the mast and the load to be carried on the other, which means that high friction forces occur between the load-bearing wheels and the bottom rail, especially when subjected to high loads, and the requisite driving torque of the drive motor has to be significantly increased in equal measure, adding extra costs to the production of the rack serving device and requiring more space in view of the more robust motors needed for the bogie assembly.

BRIEF SUMMARY OF THE INVENTION

The objective of the invention is to propose a highly dynamic rack serving device that is simple in construction, low in maintenance and not susceptible to much wear, and which reduces mechanical stress on the guide rails and guide elements, whilst increasing the availability of the rack serving device.

The objective of the invention is achieved as a result of the features defined in the characterising part of claim 1. The advantage resides in the fact that, because the bogie assemblies and displacement drives are of a separate construction and because they are drivingly linked by means of the coupling mechanisms, the bogie assemblies are able to withstand static and dynamic inertial forces, whereas the displacement drives, which are small in terms of their dimensions and separately driven, are required exclusively to generate the forward motion for the rack serving device and do not have to support any loads of the rack serving devices or the loads to be transported, which enables the rack serving device to be operated for long periods without any maintenance and also significantly improves the driving dynamics.

Also of advantage are the embodiments defined in claims 3 and 4, whereby the forces of forward motion of the bottom and top displacement drive acting on the coupling parts and linkage points, which are arranged offset transversely to the longitudinal extension of the guide rails of the guide rails on the bottom and top bogie assembly or mast foot and mast head, reduce mechanical stress on the height guide element and the guide rail part of the bottom drive rail supporting the height guide element as the mast is moved along the guide rails.

Also of advantage are the embodiments defined in claims 6 to 8, providing a displacement drive that is prevented from turning, which is guided in the height direction and at the side and forms a separate unit from the running rail, as well as being small in dimension and inexpensive.

As defined in claim 11, the use of elastomers or steel encased in plastic for the height guide, lateral guide, drive and contact elements of the bogie assemblies and displacement drives keeps noise to a minimum during operation of the rack serving devices. Another advantage is the fact that these materials have a high force-slip coefficient, which enables the requisite driving forces to be transmitted, even in situations of high acceleration and deceleration. As a result of the noise-reducing features, the rack serving device generates a low sound pressure level, even at very high speeds, and can therefore also be used where people are around.

Also of advantage is the embodiment defined in claim 12, whereby the vertical displacement path or height displacement of the load-bearing means is such that the load-bearing means can be moved essentially along and over the entire height of the mast.

In the case of the embodiments defined in claims 13 and 14, the displacement drive and the bogie assembly each constitutes a separate unit and they can be coupled or connected to one another, preferably releasably, by means of at least one coupling mechanism. The bottom and top bogie assembly guide the mast in the direction of its height and at the side and form a self-supporting system, the advantage of which is that if a displacement drive is defective, once the connection between the bogie assembly and the displacement drive has been uncoupled or released, it can be taken off the rail and an operation-ready displacement drive immediately fitted on the rail again. This reduces cost-intensive down times and any repair and/or maintenance work which is needed can be easily carried out away from the working area of the rack serving device.

Also of advantage are the embodiments defined in claims 15 to 18, because if the mast shifts from its vertical position, the runner, which is pivotably mounted in the bogie assembly, is automatically moved into a pre-definable horizontal position and the lateral guide elements run parallel with the aisle direction, thereby avoiding any wear which might otherwise occur if the lateral guide members were to assume inclined positions. The wiper bar, which fulfils various functions, serves on the one hand as a cleaning mechanism for the guide tracks, in particular the rails, and on the other hand as a support element for the return elements disposed between the base and it, thereby ensuring that if the mast assumes a crooked position, the runner or the lateral guide elements is or are automatically moved into a horizontal position, thereby providing an optimal lateral guiding action irrespective of the operating position of the mast.

As a result of an embodiment defined in claim 19, the forward displacement forces can be transmitted by the displacement drives to the bogie assemblies without any backlash.

Also of advantage are the embodiments defined in claims 20 and 21, because any deviations in the linearity of the rails can be compensated between bogie assemblies and displacement drives, which prevents the latter from being forced.

As defined in claim 22, the coupling connections disposed between the bogie assemblies and displacement drives ensure that if the mast deviates from its vertical position, it can be positioned in two spatial directions without any clearance relative to the displacement drives. Any changes in length or deformations in the mast caused by repairs or stress and any inaccuracies in the way the guide tracks are laid can be compensated by the coupling mechanisms.

The embodiments defined in claims 23 to 26 are also of advantage because they offer a coupling mechanism capable of transmitting high forward forces, enabling the forward force of the displacement drive to be transmitted to the mast, in particular the bogie assembly, without any clearance.

The embodiments defined in claims 28 and 29 eliminate the risk of the mast tipping over or lurching, even if it assumes an inadmissibly crooked position. This mechanical safety feature is easy to produce and inexpensive to make and the anti-lift system can be easily fitted on the mast foot and mast head.

Also of advantage are the embodiments defined in claims 30 to 32, whereby the location of the rack serving device and/or the position of the load-bearing means on the rack serving device can be exactly detected within a pre-definable operating range and the data and signals acquired as a result can be used for further processing, for example for a control system, thereby permitting fully automated operation in an order picking system.

Also of advantage is the embodiment defined in claim 33, whereby image-processing elements can be provided in regions that are difficult to access, such as on the bogie assembly and/or displacement drive in the mast head region in order to detect data as a means of monitoring status and/or generating maintenance prognoses, and the data is then forwarded to a control system, where it can be simply evaluated and further processed. Shelves can be monitored by providing image-processing elements on the load-bearing means, for example, which means that as they are approached, it will be possible to ascertain whether the shelves of a racking system are occupied. The data detected by the image-processing elements and forwarded to the control system can then naturally also be transmitted via local-area and/or worldwide networks, such as an intranet, the Internet, for example, for remote maintenance purposes.

Also of advantage is the embodiment defined in claim 34, whereby even slight deviations of the load-bearing means from its preferably horizontal orientation can be detected by means of a sensor system disposed on the load-bearing means, in which case an adjustment can be made to the driving torque of the drive roller and the forward speed of at least one displacement drive so that the load-bearing means is horizontally aligned, as a result of which the load-bearing means can be used as a reference level on the basis of which the lift carriage can be exactly positioned during the process of storage in or retrieval from a shelf. Detecting the exact position of the load-bearing means enables collisions to be avoided when storing and/or retrieving a pallet in the shelf, for example.

An embodiment defined in claim 35 enables at least one traction drive to be controlled depending on a load to be placed on the load-bearing means, depending on which the contact force of the drive elements on the rails can be adjusted, thereby essentially preventing any slip between the drive elements and the rails during the driving process.

The embodiments defined in claims 36 to 40 enable at least one ladder displaceable along a rail to be moved into position to permit maintenance work to be carried out rapidly on the rack serving device.

Finally, the objective is achieved by the invention as a result of the features defined in claim 41. The surprising advantage of this approach is that a plurality of rack serving devices of the same type can be used in any combination with one another and can be assembled with one another to produce one rack serving unit, offering an easy mix and match system to meet different requirements, for example the geometry of the goods being conveyed, the load-bearing capacity of the rack serving device, keeping count of warehouse turnover, etc. This ability to use the rack serving devices in any combination offers a high degree of flexibility, in keeping with modern automation systems, without involving much in the way of extra work in terms of assembly.

In one advantageous embodiment defined in claim 42, a support frame attached to the mast foot and mast head enables a frame-type rack serving device with two masts to be created, thereby enabling it to be modified to cater for different applications. Since the rack serving devices are built in a modular structure, the refitting work needed for this purpose can be carried out very rapidly and easily.

The embodiment defined in claim 43 enables warehouse turnover to be increased because goods can be handled by several rack serving devices simultaneously.

An embodiment defined in claim 44 is also of advantage because of the pitch of the mast in a plane parallel with the aisle direction, which means that the forces transmitted to the mast by the guide elements or load-bearing wheels supported on the lift mechanism are uniformly distributed throughout the profile cross section, because there are no points at which the material comes into contact in the immediate vicinity of the guide tracks and running surfaces. This means that a mast can be made with less thick materials but will still be capable of withstanding the same or higher loads, both in static and dynamic terms.

The advantage of this is that, in addition or merely by dint of the joining technology and manufacturing method used, namely a welding process, in particular MIG welding, dynamic stress, in particular vibrations of the mast, caused by acceleration and deceleration can be uniformly distributed in the longitudinal direction, avoiding peak stresses. As a result of the higher elasticity and the lower brittleness obtained by the fact that less heat is introduced into the mast during the welding process, particularly in the area of the weld joints, strength and durability are significantly increased, even when subjected to vibration-induced stress. The half-shell design in which joining regions with a large surface area mutually overlap or sit one on top of the other enables forces to be spread over a significantly larger surface area in the joint regions, which reduces peak stress, and the abutting longitudinal sections promote a capillary effect during the welding process so that the solder migrates or penetrates the joint regions effectively, compensating for any unevenness between abutting regions of the elongate sections.

The embodiments defined in claims 45 to 48 are of advantage because the protuberances constituting the guide tracks and the projections disposed at a right angle to the protuberances and forming the guide tracks on the one hand guide the load-bearing wheels and on the other hand impart a high degree of rigidity to the mast, even if it has a small cross section, enabling it to be subjected to high static and dynamic loads without being inadmissibly deformed. Another advantage is the fact that because the heat transmitted during the soldering process is low, the longitudinal sections, which have already essentially assumed their ultimate dimensions, do not become inadmissibly warped, thereby enabling the soldering process to be easily controlled.

Also of advantage are the embodiments defined in claims 49 and 50, because the welded joint can be individually adapted to suit pre-defined maximum static and dynamic loads.

As a result of claim 51, the cutouts provided in the mast facilitate the assembly and/or laying of power-transmitting cables, for example.

The U-shaped protuberances provided in the stiffening elements as described in claims 52 to 60 further increase the rigidity and load-bearing capacity of the mast because the forces transmitted by the load-bearing wheels onto the running surfaces of the protuberances are not only absorbed by the section strips but also by the stiffening elements in the regions adjoining the protuberances, so that the guide tracks standing proud of the side of the mast enable a high running accuracy for the lifting mechanism and the load-bearing means throughout the entire operating time.

Finally, however, the embodiment defined in claim 61 is also of advantage because the mast is able to absorb forces throughout its entire cross section and is a lightweight construction.

BRIEF DESCRIPTION OF THE DRAWINGS

The invention will be described in more detail below with reference to examples of embodiments illustrated in the appended drawings.

Of these:

FIG. 10 is a highly simplified, schematic diagram showing a front view of the mast;

FIG. 11 is a highly simplified, schematic diagram illustrating a front view of the stiffening element;

FIG. 12 is a highly simplified, schematic diagram illustrating an end-on view of the stiffening element illustrated in FIG. 11.

DETAILED DESCRIPTION OF THE INVENTION

Figure 1:
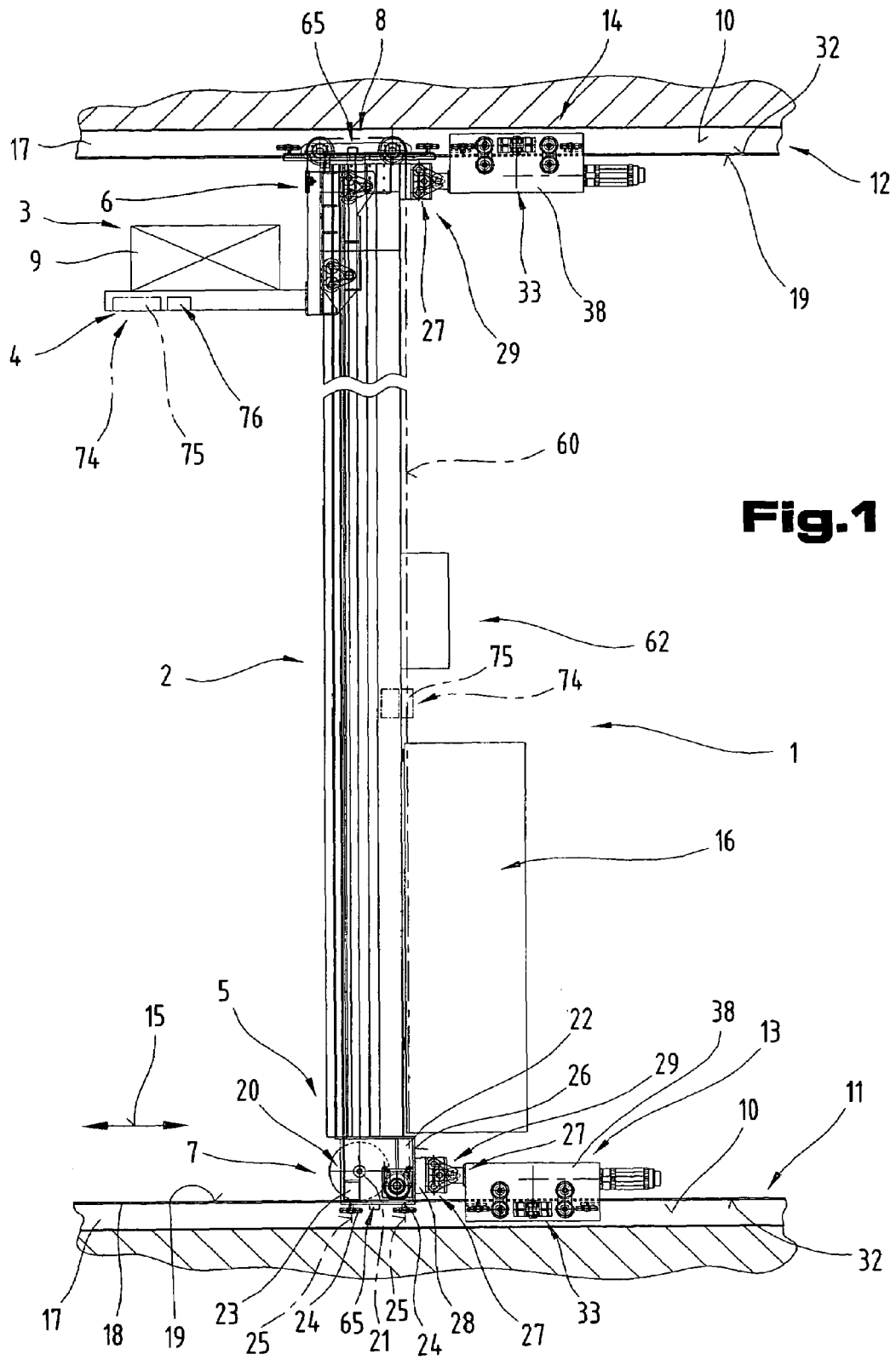
FIG. 1 is a highly simplified, schematic diagram giving a side view of a bottom and top guide track, in particular a bottom and top rail, and the rack serving device proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc, relate to the drawing specifically being described and can be transposed in terms of meaning to a new position when another position is being described. Individual features or combinations of features from the different embodiments illustrated and described may be construed as independent inventive solutions or solutions proposed by the invention in their own right. It should be pointed out from the outset that the rack serving device 1 proposed by the invention is suitable for travelling in straight lines only.

Figure 2:
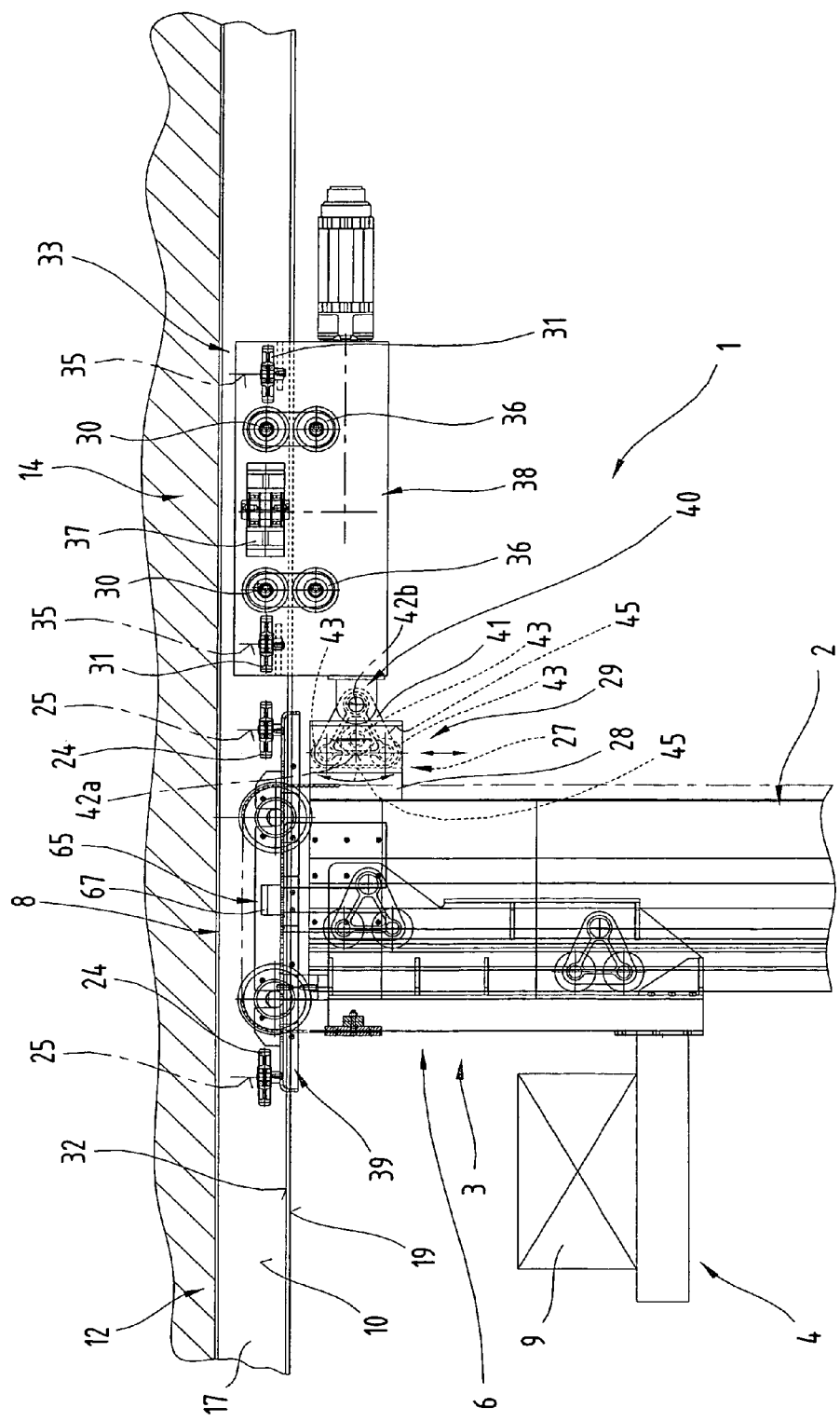
FIG. 2 is a highly simplified, schematic diagram showing a part region of the top rail and the mast head.
Figure 3:
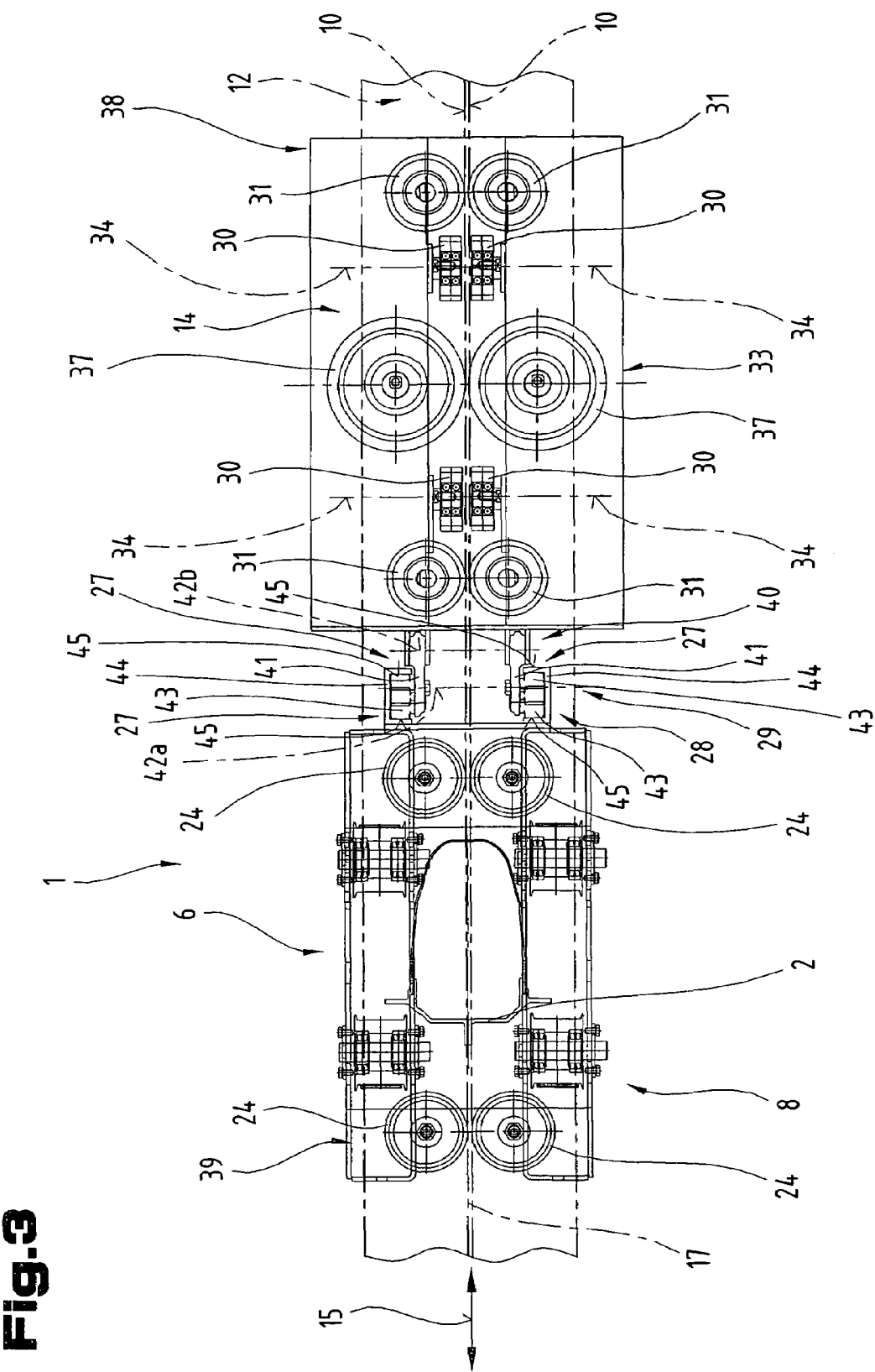
FIG. 3 is a highly simplified, schematic diagram showing a plan view of a bogie assembly and a traction drive drivingly linked to it, the top rail being indicated by broken lines.

FIGS. 1 to 3, which will be described together, illustrate a rack serving device 1 with part regions of it illustrated from different perspectives. The rack serving device 1 has a mast 2, which is preferably disposed in a substantially vertical arrangement, with a lift carriage 3 incorporating a load-bearing means 4 which can be displaced in the direction of its height and bogie assemblies 7, 8 at its mast foot 5 and mast head 6. A load 9 supported on the load-bearing means 4 can be stored in and retrieved from a racking system, not illustrated in detail, by appropriate means, which are also not illustrated. The bottom bogie assembly 7 is disposed on the mast foot 5 and the top bogie assembly 8 is disposed at the mast head 6. The bottom and top bogie assemblies 7, 8 are respectively guided at the side on at least one essentially vertical guide track part 10 of a bottom and top guide rail 11, 12 and by means of at least one other, substantially horizontal guide rail part in the height direction, which will be described in more detail below. The bogie assemblies 7, 8 differ from one another in terms of their structural design. The guide rails 11, 12 forming the guide tracks are secured to the building or racking so as to be stationary and are rectilinear in design. A displacement drive 13, 14 co-operates respectively with the mast foot 5 and mast head 6 in order to transmit a forward motion to the mast 2 in the aisle direction—indicated by double arrow 15. The bogie assemblies 7, 8 and displacement drives 13, 14 disposed one after the other in the aisle direction—indicated by double arrow 15—which can be displaced on the bottom and top guide track, in particular the bottom and top runner rails 11, 12, separately guided in the height direction and at the side, are drivingly linked to one another. The bottom and top displacement drives 13, 14 are preferably disposed one above the other on the rear face of the mast 2, on the bottom and top runner rails 11, 12. Naturally, it would also be possible for a respective displacement drives 13, 14 to be disposed one on either side of the mast 2. The displacement drives 13, 14 constitute a top and bottom adjusting mechanism. Also on the rear face of the mast 2 is a control cabinet 16, which contains, amongst other things, the control system, the automatic control system and operating electronics for a lift motor of the lift carriage 3, the displacement drives 13, 14 and such like. The guide tracks and the runner rails 11, 12 constituting them are preferably of a flange shaped design in the shape of an I-rail. Contact wires, not illustrated, are disposed on the bottom runner rail 11 on a vertical web 17, which supply the rack serving device 1 with power and by means of which a data exchange can be run from the stationary warehouse management computer to the rack serving device 1 and back. Naturally, the contact wire may also run parallel with and at a distance from the runner rail 11.

The bottom bogie assembly 7 has at least one height guide element 20 which rolls on the horizontal guide track part 19 formed by a top belt 18 of the runner rail 11. The bottom bogie assembly 7 may naturally also have a series of load-bearing height elements 20 disposed one after the other in the aisle direction—indicated by double arrow 15—, in particular height guide rollers. In the embodiment illustrated as an example here, the height guide element 20 is provided in the form of a guide roller made from steel, which may or may not have a plastic sheath surrounding the running surface. A rotation axis 21 of the height guide roller extends transversely to the aisle direction—indicated by double arrow 15—or longitudinal extension of the runner rail 11. A housing-type surrounding frame 22 forming the bogie assembly 7 houses the rotation axis 21 and supports the height guide roller by means of a bolt disposed in the surrounding frame 22. The surrounding frame 22 has a U-shaped cross section and bears at least one lateral guide element 24 on each of its side walls 23, spaced apart from one another by a distance corresponding at least to the width of the top belt 18, disposed adjacent to the vertical guide track parts 10 of the web 17 of the bottom runner rail 11. The lateral guide elements 24 are expediently joined to the bogie assembly 7 in an articulating arrangement so that the rotation axes 25 of the lateral guide elements 24 are always oriented perpendicular to the aisle direction—indicated by double arrow 15—and parallel with the guide track parts 10, even if the mast 2 assumes a crooked position. A guide mechanism incorporating the bottom bogie assembly 7 also incorporates the height guide element 20 and the lateral guide elements 24.

FIG. 1 illustrates the bottom bogie assembly 7 with four lateral guide elements 24, the lateral guide elements 24 being arranged in pairs adjacent to one another on the side walls 23 and one after the other in the aisle direction—indicated by double arrow 15. Naturally, it would also be possible for the bogie assembly 7 to have only two lateral guide elements 24 arranged one after the other in the aisle direction—indicated by double arrow 15—and diagonally offset from one another. In the most basic situation, the lateral guide elements 24 may also be provided in the form of lateral guide rollers with rotation axes 25 disposed perpendicular to the runner rail 11 and substantially parallel with the guide track parts 10. Provided respectively on a rear wall 26 of the bogie assembly 7 or on the rear wall of the mast foot 5 and on the displacement drive 13 is at least a first linkage point for transmitting or applying a forward force or forward motion from the displacement drive 13 to the bogie assembly 7. A coupling connection 27, which will be described in more detail below, extends between these linkage points.

In this embodiment, the first linkage point of the displacement drive 13 is disposed on the bogie assembly 7 transversely to the horizontal guide track part 19, offset in the direction of the mast foot 5. The mechanical load to which the guide track parts 19 is subjected can be further reduced by arranging the linkage point of the displacement drive 14 on the bogie assembly 7 transversely to the horizontal guide track part 19, offset in the direction opposite the mast foot 5. The at least one first linkage point consists of a coupling part 28 rigidly mounted on the mast 2 or bogie assembly 7. The drive connection consists of at least one coupling mechanism 29 between the bogie assembly 7 and the displacement drive 13 and the other linkage point between the mast-side linkage point and the other linkage point spaced apart from it on the side of the displacement drive, so that the coupling mechanism 29 can effect a pivoting motion in at least one of the linkage points of the bogie assembly 7 and/or displacement drive 13. The mast-side linkage point and the drive-side linkage point are preferably disposed on the same side as that at which the mast-side linkage point is displaced, above and below the guide track parts 19. Naturally, it would also be possible for the mast-side linkage point to be disposed above the guide track parts 19 and the drive-side linkage point to be disposed underneath, or the mast-side linkage point could be disposed underneath and the drive-side linkage point on top. A more detailed description of the structural design of the linkage points and the coupling mechanism 29 will be given with reference to FIGS. 2 and 3.

As may be seen by looking at FIG. 1 in conjunction with FIG. 3, the displacement drives 13, 14 each constitute a separate unit drivingly linked to the bogie assemblies 7, 8, whereby the displacement drives 13, 14 are guide by their at least one height guide element 30 and at least one lateral guide element 31 on guide track parts 19, 32 in the height direction and at the side, and can be displaced in a straight line by means of at least one drive mechanism 33 along the bottom and top runner rails 11, 12.

The height guide elements 30 are provided in the form of height guide rollers with rotation axes 34 extending transversely to the aisle direction—indicated by double arrow 15—and longitudinal extension of the runner rails 11, 12 and parallel with the guide tracks 19; 32 and the lateral guide elements 31 are provided in the form of lateral guide rollers with rotating rotation axes 35 extending perpendicular to the aisle direction—indicated by double arrow 15—and longitudinal extension of the runner rails 11, 12 and parallel with the guide track part 10.

Each of the displacement drives 13, 14 has at least two pairs of height guide elements 30 spaced apart from one another in the aisle direction—indicated by double arrow 15—on either side of the web 17 of the preferably I-shaped runner rails 11, 12, which sit against guide track parts 19, 32 of the bottom and top runner rails 11, 12 facing away from one another and at least one contact element 36 abutting with guide tracks 32, 19 of the mutually spaced top and bottom runner rails 11, 12 and preferably at least two pairs of lateral guide elements 31 spaced apart from one another in the aisle direction on oppositely lying guide tracks 10. The height guide elements 30 and contact elements 36 may optionally be linked to one another by means of an endlessly circulating traction means.

Naturally, another option would be to provide two height guide elements 30 one after the other in the aisle direction—indicated by double arrow 15—diagonally offset from one another to provide a height guide for the displacement drives 13, 14 and two lateral guide elements 31 one after the other in the aisle direction—indicated by double arrow 15—and diagonally offset from one another providing a lateral guide.

The contact elements 36 are provided in the form of pressure rollers which are elastically deformable in the radial direction and have rotation axes disposed transversely to the aisle direction—indicated by double arrow 15—and longitudinal extension of the runner rails 11, 12, applying a contact force in the direction of the guide track part 19; 32.

The drive mechanism 33 of the adjusting mechanisms and the displacement drives 13, 14 forming it each have at least one drive roller 37, which can be driven by a drive motor, which engages on the guide track part 10 of the web 17. Naturally, it would also be possible to provide several driven drive rollers 37 engaging on the oppositely lying guide track parts 10 of the web 17, as illustrated in FIG. 3, or at least one non-driven follower wheel could be provided, which is pressed against the guide track parts 10 with a pre-definable contact force. The rotation axis of the drive roller 37 extends parallel with the rotation axes 35 of the lateral guide rollers and perpendicular to the longitudinal extension of the runner rails 11, 12. The drive torque of the drive roller 37 is therefore transmitted by a friction lock, thereby applying a forward motion to the displacement drives 13, 14 and bogie assemblies 7, 8. The drive motor of the displacement drives 13, 14 may be a servo motor or stepper motor, which is preferably linked directly to the drive roller 37, or an asynchronous motor or synchronous motor with a gear mechanism between it and the drive roller 37.

The height and/or lateral guide rollers of the displacement drives 13, 14 may be manually or automatically adjusted in order to obtain a secure contact or rolling action and a reliable transmission of the driving torque on and to the guide tracks 10, 19, 32. A housing 38 which essentially surrounds the runner rails 11, 12 supports the drive motor and has appropriate means for mounting the height and lateral guide elements 30, 31, 36 so that they can be displaced in rotation.

Although not illustrated, the height and/or lateral guide elements 30, 31 of the displacement drives 13, 14 are respectively disposed on a common support frame and the height and/or lateral guide elements 30, 31 are pushed against the guide track parts 10, 19, 32 under the action of at least a contact force acting on the support frame.

The top bogie assembly 8 drivingly linked to the top displacement drive 14 via the coupling mechanism 29 has two pairs of lateral guide elements 24 spaced apart from one another in the aisle direction—indicated by double arrow 15—on oppositely lying guide track parts 10 of the top guide track or runner rail 12, which are preferably provided in the form of lateral guide rollers rolling along the guide track parts 10 and which rotate about the rotation axis 25 extending perpendicular to the longitudinal extension of the runner rail 12. The top bogie assembly 8 attached to the mast head 6 is essentially provided in the form of a support frame 39 supporting pairs of lateral guide elements 31 disposed one after the other in the aisle direction—indicated by double arrow 15. The support frame 39 is designed with structural means for mounting the lateral guide rollers. As may be seen from FIG. 3, there are also 2 pairs of output elements for a lift mechanism, which will be described in more detail below. In respect of the top bogie assembly 8, it would naturally also be possible for it to have only two lateral guide elements 24 disposed one after the other in the aisle direction—indicated by double arrow 15—and arranged offset from one another, in particular lateral guide rollers. A guide mechanism incorporating the top bogie assembly 8 also incorporates the lateral guide elements 24.

It should be pointed out at this stage that it would also be possible for the height and lateral guide elements 20, 24; 30, 31 of the bogie assemblies 7, 8 and/or displacement drives 13, 14 to be provided in the form of guide bars which can be applied to the guide track parts 19, 32, 10 with a pre-definable contact force, although this option is not illustrated.

As a result of the bottom bogie assembly 7 at the mast foot 5 co-operating with the top bogie assembly 8 at the mast head 6, the mast 2 constitutes a system whereby a forward motion can be transmitted via the linkage points in the region of the mast foot 5 and mast head 6 by the displacement drives 13, 14 to enable it to be displaced along the bottom and top runner rail 11, 12, guided in the height direction and at the side.

The at least one other linkage point on the top bogie assembly 8 is disposed transversely to the horizontal guide track part 19, expediently offset in the direction towards the mast 2, or optionally in the other direction. The mast-side linkage point and the drive-side linkage point are preferably disposed on the same side as that to which the mast-side linkage point is offset, optionally above or expediently underneath the guide track part 19. Consequently, at least when the mast 2 is being moved along the guide tracks or guide rails 11, 12, the bottom height guide element 20 and the bottom guide track or bottom runner rail 11 is relieved of pressure.

As briefly described above and illustrated more clearly in FIG. 2, the coupling mechanism 29 is actively connected to at least one other linkage point disposed on the mast head 6. In addition to the coupling part 28 arranged on the mast 2, the coupling mechanism 29 also has at least one other coupling part 40 disposed on the displacement drive 13, 14, between which the coupling connection 27 linking the two extends.

The coupling mechanism 29, which is essentially of a fork-shaped design, has two jaw parts 41 spaced apart from one another transversely to the longitudinal extension or aisle direction—indicated by double arrow 15—mounted so as to be pivotable about drive-side coupling parts 40, which are preferably disposed in a triangular-shaped arrangement. The jaw parts 41 have at least two guide elements 43 in their corner regions directed towards the mast 2 and another guide element 43 substantially in the region of a centre of gravity of the jaw parts 41.

The coupling mechanism 29 has at least two articulation axes 42a, 42b, one of which articulation axes 42a directed towards the bogie assembly 7, 8 coincides with the mast-side coupling part 28, whilst the other articulation axis 42b spaced apart from it and directed towards the displacement drive 13, 14 coincides with the drive-side coupling part 40. The coupling part 40 and an and of the coupling connection 27 directed towards it each have a bore with a coupling pin extending through it, the longitudinal mid axis of the coupling pin and the articulation axis 42b of the coupling part 40 extending congruently with one another. In order to accommodate the displacement drive 13, 14 so that it can rotate relative to the bogie assembly 7, 8, the coupling connection 27 is mounted so as to be elastic in the longitudinal direction of the coupling pin by means of a rubber compensating element disposed in the region of the articulation axes 42a; 42b.

The coupling part 28 incorporating the first mast-side linkage point has at least one, preferably two mutually spaced, section-type longitudinal guides 44 corresponding to the guide elements 43 and extending substantially parallel with the longitudinal extension of the mast 2, the resultant vertical guide tracks 45 of which serve as a support for the guide elements 43. Mechanical means, for example displaceable eccentrics, enable a clearance-free adjustment of the guide elements 43 relative to the guide tracks 45 and the mast 2 is connected to the bottom and top displacement drive 13, 14 without any clearance so that the forward motion can be transmitted at least in the aisle direction—indicated by double arrow 15. If the mast 2 happens to deviate from the vertical position, the coupling mechanism 29 permits a pivoting motion about the articulation axis 42b and a vertically guided change in the position of the mast 2, as the rolling guide elements 43 are vertically displaced along the guide tracks 45. The mast 2 therefore has two degrees of freedom in the direction of its longitudinal extension and in the aisle direction—indicated by double arrow 15. As a result, even if the mast 2 assumes a crooked position, it can be maintained in position without being forced at the mast foot 5 and mast head 6 relative to the displacement drives 13, 14. The fact that a clearance is left free between the guide elements 43 and the longitudinal guides 44 transversely to the longitudinal extension of the runner rails 11, 12 enables any deviations in the linearity of the runner rails 11, 12 to be compensated, which prevents the bogie assemblies 7, 8, which are guided in the height direction and to the side, and displacement drives 13, 14 from being clamped against one another.

Although not illustrated, another embodiment designed to compensate for deviations in the linearity of the runner rails 11, 12 is one in which the bogie assemblies 7, 8 and displacement drives 13, 14 are guided relative to one another without any clearance by means of the coupling mechanism 29 transversely to the longitudinal extension of the runner rails 11, 12 and the height and/or lateral guide elements 30, 31 and drive rollers 37 and pressing elements 36 of the displacement drives 13, 14 are disposed on a guide carriage which can be displaced along a guide mechanism transversely to the aisle direction—indicated by double arrow 15—and transversely to the runner rails 11, 12. To this end, the guide carriage is designed so that it can be displaced relative to the housing 38 of the displacement drive 13, 14.

In another embodiment of the coupling connection 27, not illustrated, it is provided in the form of an actuatable drive, in particular a threaded spindle, which is displaceably affixed to the articulation axes 42*a*, 42*b*.

Figure 4:
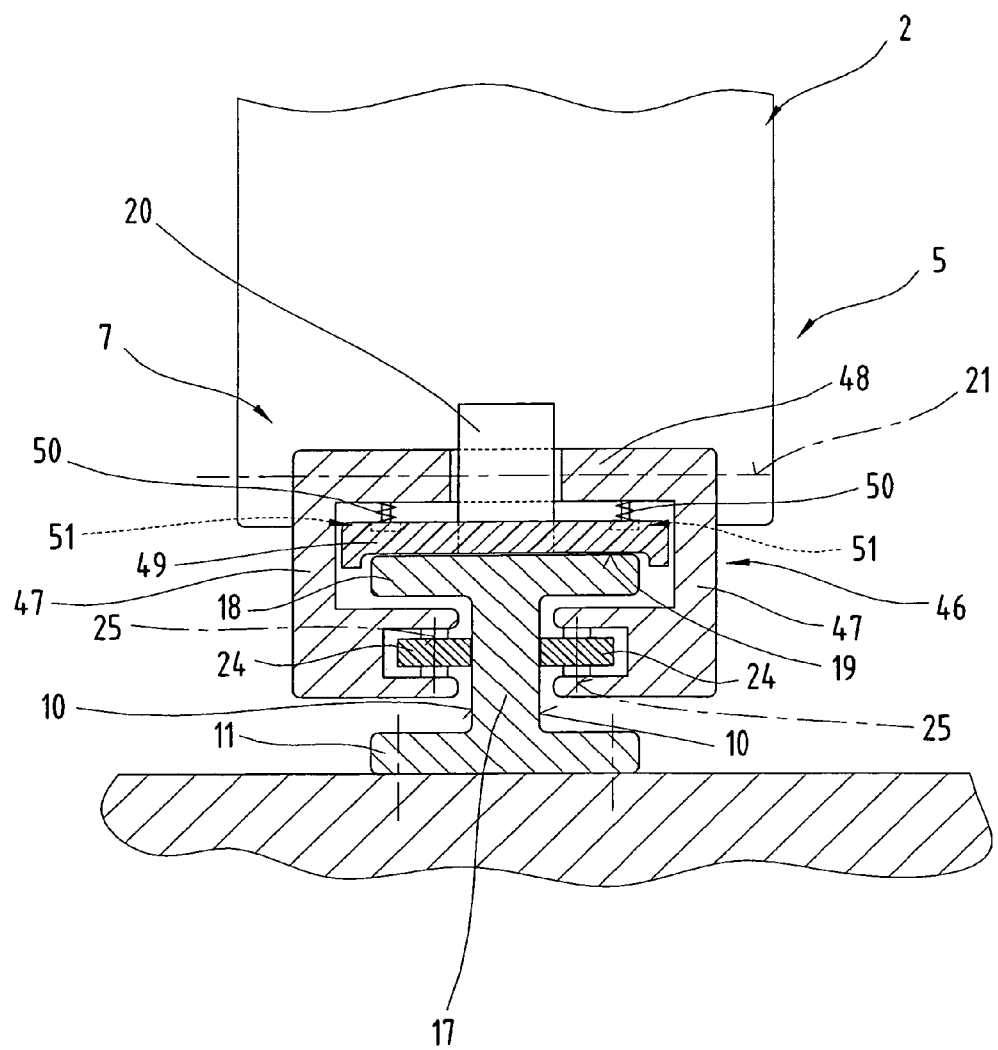
FIG. 4 is a highly simplified, schematic diagram illustrating another embodiment of the bottom bogie assembly with a runner supporting the lateral guide elements, seen in section transversely to the aisle direction.

FIG. 4 is a partial section illustrating a part region of the mast 2 with the mast foot 5 bearing the bottom bogie assembly 7 and a runner 46 co-operating with the bogie assembly 7, as well as the bottom guide track and the runner rail 11 constituting it. The bogie assembly 7 has at least one height guide element 20, in particular the height guide roller, which rotates about the rotation axis 21 extending transversely to the longitudinal extension of the runner rail 11 and rolls along the horizontal guide track part 19 of the runner rail 11, and the runner 46, which is mounted so as to be pivotable about the rotation axis 21 of the height guide elements 20. The runner 46 essentially engages round the runner rail 11, being substantially U-shaped in cross section, and has lateral guide elements 24 on its legs 47 extending substantially parallel with the web and mutually spaced apart from the latter, which are rotatable about rotation axes 25 extending parallel with the guide track parts 10 of the web 17. Disposed on a base 48 of the runner 46 facing the top belt 18 of the runner rail 11 is at least one wiper bar 49 which rides on the guide track parts 19. The substantially plate-shaped wiper bar 49, the contour of which is adapted to match the top belt 18, is designed to be displaceable about its transverse median axis extending parallel with the rotation axis 21 of the height guide roller against the action of elastic return elements arranged on either side of the transverse median axis. The wiper bar 49 therefore acts as a sort of dolly, which always sits with its full surface essentially flat against the guide track part 19 of the runner rail 11 irrespective of the operating position of the mast 2. The elastic return elements 50, which are provided in the form of spring systems, for example, are held in position between the runner bar 49 and the base 48 of the runner 46 by means of pin-type guide elements 51. Another advantage of providing the wiper bar 49 primarily resides in the fact that if the mast 2 is moved into a crooked position by the return elements 50 spaced apart from one another about the transverse median axis, an equilibrium of forces occurs in the return elements 50, which are spaced apart from one another in the longitudinal direction, and the resultant reaction forces of the return elements 50 move the runner into a pre-definable, in particular horizontal position, thereby orienting the lateral guide elements 24 in such a way that the rotation axes 25 are disposed perpendicular to the longitudinal extension of the runner rail 11. In this particular embodiment, two pairs of return elements 50 co-operate with the wiper bar 49. Even if the mast 2 assumes a crooked position, the fact that the runner 46 bearing the lateral guide elements 24 is automatically oriented avoids generating additional friction-induced wear, which would otherwise occur as a result of such a crooked position or contact with the lateral guide elements 24. The wiper bar 49 is preferably made from a wear-resistant plastic, such as polytetrafluoroethylene, polyamide.

Naturally, the return elements 50 could also be provided in the form of mechanically and/or electrically and/or hydraulically and/or pneumatically operated means.

For the sake of simplicity, the structural design and operating mode of the runner 46 will be described in connection with the region of the mast foot 5 only. Clearly, the mast head 6 and the top bogie assembly 8 could also be provided with the same type of runner 46. However, this is not illustrated as such.

Figure 5:
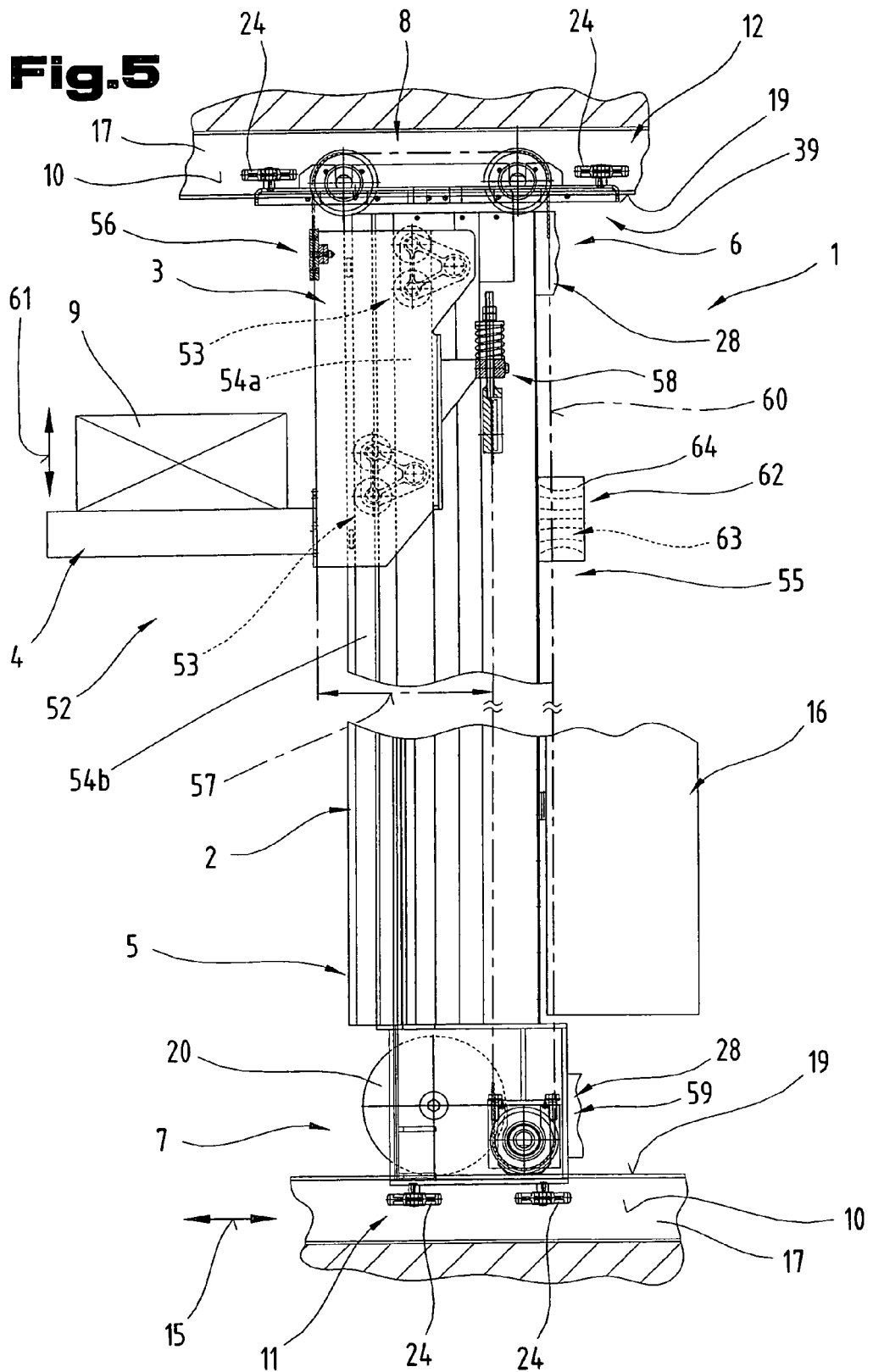
FIG. 5 is a highly simplified, schematic diagram showing a side view of a part region of the rack serving device with a lift mechanism proposed by the invention.

FIG. 5 illustrates a side view of a lift mechanism 52 of the rack serving device 1, which constitutes a separate invention in its own right. With a view to keeping the description simple, the diagram shows only the bogie assemblies 7, 8 on the mast foot 5 and mast head 6, which are guided on guide track parts 10, 19 of the bottom and top guide tracks and the runner rails 11, 12 forming them. The structure and operating mode of the bogie assemblies 7, 8 described above in respect of FIGS. 1 to 4 also apply here. The sled-type lift carriage 3 incorporating load-bearing means 4, displaceable in the height direction of the mast 2, is guided by means of a guide mechanism with at least one, preferably two height and/or lateral guide elements 53 on at least one guide track 54 of the mast 2 and is displaceable essentially vertically along the guide track 54 by means of a drive mechanism 55. The lift carriage 3 also has load-bearing means 4 extending out above the guide track 54. At least one linkage point 56 of the drive mechanism 55 on the lift carriage 3 is arranged transversely to the vertical guide track 54, for example offset in the direction of the load-bearing means 4. As may also be seen from this drawing, at least one other linkage point 58 is provided on the lift carriage 3, arranged transversely to the guide track 54, offset in the direction of the mast 2, and at a distance 57 from the at least one first linkage point 56.

The drive mechanism 55 has at least one drive element 60, which can be driven by a lift motor 5 connected to the lift carriage 3, which is displaceable by means of the belt-type drive element 60 at the first and other linkage point 56, 58. The belt-type drive element 60 is an endless traction belt, in particular a cogged belt. The lift motor 59, which has a drive element, is arranged on the mast 2, preferably in the region of the mast foot 5 or on the bottom bogie assembly 7. Lying opposite it in the region of the mast head 6 is at least one drive member for the drive element 60 circulated about it. The distance 57, as measured horizontally, is variable and is defined by selecting different diameters of the drive member and drive element. By preference, the mast head 6 or the support frame 39 has two output elements, in particular pulley rollers, spaced apart from one another in the aisle direction indicated by double arrow 15—about which the drive element 60 is circulated during a displacement of the lift carriage 3. End regions of the drive element 60 are connected directly to the lift carriage 3 so as to be immobilised by fixing mechanisms directly in the linkage points 56, 58.

If several drive elements 60 extending parallel with one another are used, their end regions are articulatingly linked by means of anchoring legs on the lift carriage 3, although these are not illustrated. This being the case, an anchoring leg, which is mounted so as to pivot on an articulating joint about an axis extending transversely to the direction of displacement—indicated by double arrow 61—is provided at each of the linkage points 56, 58 and at least two finite drive elements 60 are connected to the two anchoring legs at their end regions on either side of the articulating joint.

Within the scope of the invention, the rack serving device 1 proposed by the invention may specifically be operated in a deep-freezing or cooling area or at low temperatures, in which case the drive element 60 co-operates with at least one system 62 for regulating a temperature of the drive element 60. The system 62 is preferably mounted on the rear face of the mast 2 disposed along a part of the length of the drive element 60. In order to regulate the temperature, energy is delivered to the drive element 60 by means which may be contactless or involve contacts or involve physical contact. The belt-type drive element 60 is fed past or fed through at least one energy field 63, the energy field 63 being provided in the form of a mechanical or magnetic or electrical or electromagnetic field. The electromagnetic field is preferably provided as a medium-frequency or high-frequency alternating field. The system 62 has at least one induction device 64 to which an alternating current is applied or at least one microwave generator to create an energy field 63 which is actively linked to the drive element 60. The system 62, which essentially extends at least around the drive element 60 and the induction device 64 incorporates the primary induction coil, and current or voltage in a secondary induction coil is provided via strengthening supports of the drive element 60, although these are not illustrated. The voltage induced in the strengthening supports, in particular steel wires, on the one hand enables the temperature of the drive element 60 to be regulated and on the other provides a status-monitoring system, in particular for monitoring the load capacity of the strengthening supports. The strengthening supports therefore form at least one loop of electrically conductive material, extending across at least a part of the length of the drive element 60. Naturally, it would also be possible to provide the loop in the form of an electrically conductive film, in particular copper film, a film of steel alloy or spring steel, extending across at least the length and at least a part of the width of the drive element 60. The strengthening supports are made from electrically conductive materials known from the prior art, such as aramide or steel and glass fibres.

The system 62 is mounted externally to the drive element 60, either stationary at a distance from it or so as to be displaceable in the drive element and/or along the drive element 60. In order to regulate the temperature, at least one measuring means is provided in or directly adjacent to the drive element 60 to detect the temperature of the drive element 60, in particular a strain gauge, thermocouple. The actual temperature values detected by the measuring means are forwarded to a control system in the control cabinet 16 or to a central control system, where appropriate control algorithms are provided in order to regulate and adapt the actual value to a pre-settable desired value for the temperature of the drive element 60.

At least the fixed induction coil, to which alternating current is applied, is provided in the form of a network-side primary coil and induces current or voltage in the strengthening supports acting as the secondary coil by means of the changing magnetic flow in at least one electrically conductive material. The relative displacement of the drive element 60 in respect of the system 62 and hence in respect of the energy field 63, in particular the electromagnetic field, enables a uniform, pre-definable temperature of +15° C., for example, to be set and maintained across the entire length and cross section of the drive element at an ambient temperature of −10° C., for example. As a result of the invention, it is now possible to warm or heat the drive element 2 to a predefined minimum temperature during the relative displacement between it and the at least one system 62. The frequency range primarily, and optionally the current intensity, may serve as variables for regulating the primary side induction coil to which alternating current is applied. The electromagnetic energy field 63 is generated by operating the induction coil in the medium-frequency or high-frequency range, in which case the frequency range is between 1 kHz and 150 kHz, for example 50 kHz.

By applying the energy field 63 intermittently or to at least certain regions of the drive element 60 and the electrically conductive strengthening supports, heat is generated in at least a part region of the drive element 60 due to the power loss, depending in particular on the frequency of the primary-side induction coil. The control system of the warehouse management system is configured so that the frequency is set depending on the circulation speed of the drive element 60 and/or the temperature to which the drive element 60 is subjected and/or a fixed actual value for the temperature determined by a measuring means, for example a thermocouple, pyrometer, by which the temperature is contactlessly detected. The drive element 60 may be equipped with measuring means disposed at a distance from one another in the direction of its length for intermittently or locally detecting the actual value of the temperature in different regions of the drive element 60. These individually detected actual values of the temperature are forwarded to the control system, where they serve as a basis for calculating the arithmetic mean value of the temperature in order to control whatever parameter is used, such as the frequency of the induction coil or a microwave generator, the heat output contactlessly transmitted by the system 62 or the current intensity of the current flowing through the strengthening supports. Sensor systems known from the prior art may be used to set these individual parameters, such as temperature sensors, strain gauges, thermocouples. The sensor systems for detecting ambient influences, such as air humidity, ambient temperature, etc., are disposed in the surrounding area, for example in the room in which the rack serving device 1 is installed, and are connected to the control system to permit data transmission. Measuring means are provided in or on the drive element 60 in order to determine the actual value of its temperature. The actual temperature value of the drive element 60 may be detected in the running layer and/or the facing layer and/or the traction layer and each of the individual measurement values forwarded to the control system will be used as a basis for determining a control variable for the parameter. Alternatively, the actual temperature value may also be detected by contactless means. Applying regulated heat and maintaining a set temperature permits a dynamic displacement of the lift carriage 3 and the load-bearing means 4, even at low temperatures, for example in the range of between 0° C. and −80° C.

The system 62 could also be provided in the form of a heating element, such as filaments or a radiator element such as a heat exchanger, blowers, in order to create a thermal energy field 63 which acts on the drive element 60. Clearly, the system 62 could also be provided on or in the lift carriage or alternatively by means of it.

In another embodiment, although this is not illustrated, a direct voltage is applied to clamp contacts connected to the strengthening supports so that the strengthening supports essentially act as a heating element, thereby enabling the pre-definable temperature to be set and/or maintained in the drive element 60.

As regards the various embodiments which may be used for the system 62 for regulating the temperature, the operating modes of the different systems 62, the method of regulating the temperature of the drive element 60 and the various structural designs of the drive element are described in detail in Austrian patent application A 822/2001, which is specifically included in this disclosure. For this reason, more detailed explanations will not be given in this disclosure.

Figure 6:
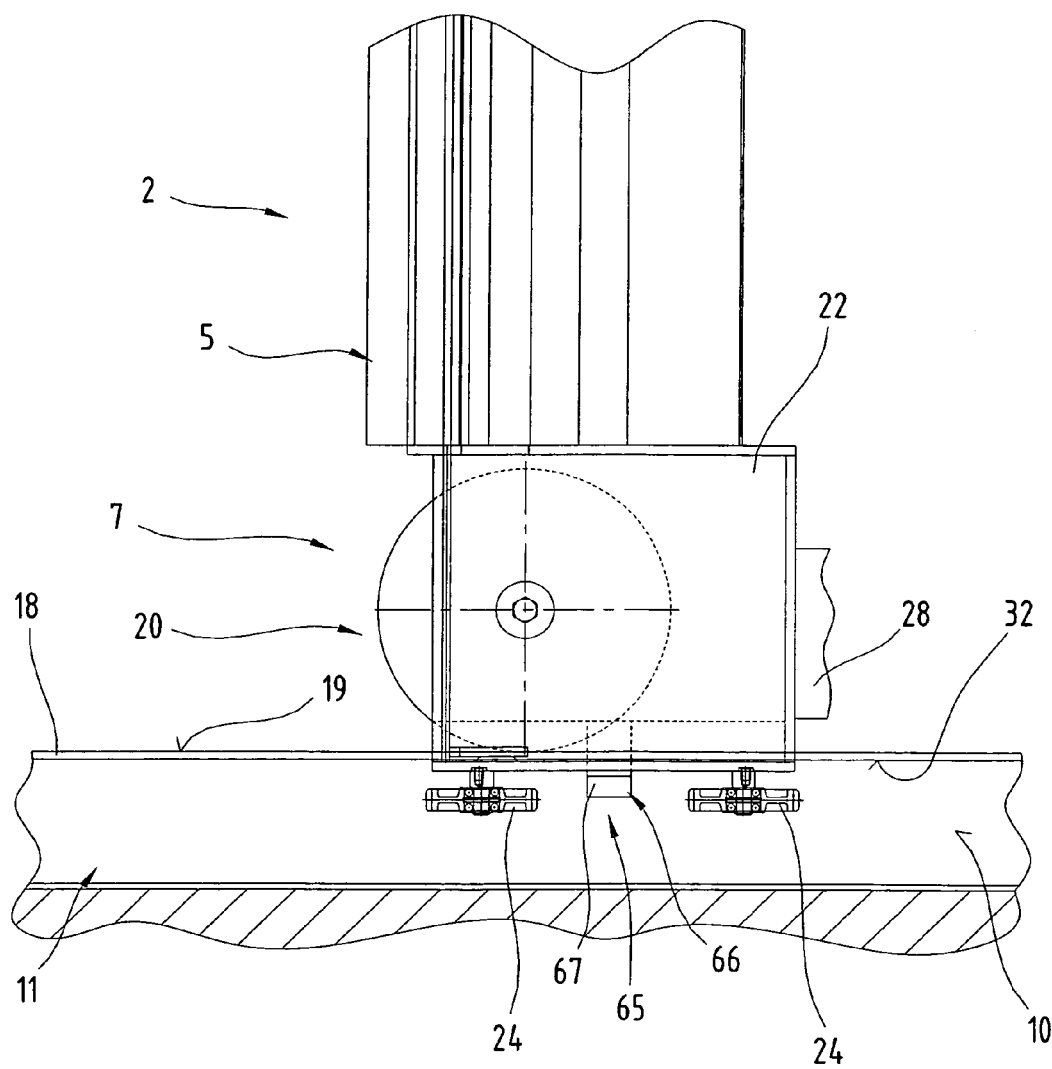
FIG. 6 is a highly simplified schematic diagram showing a side view of a part region from FIG. 1 with the bottom rail, the mast foot and bottom bogie assembly, and an anti-lift mechanism disposed between the rail and the bogie assembly.

FIG. 6 illustrates a part region of the mast 2 with the bogie assembly 7 disposed at the mast foot 5, which is supported and guided on the bottom guide track and the runner rail 11 formed by it by means of height and lateral guide elements 20, 24. The housing-type surrounding frame 22 of the bogie assembly 7 has at least one anti-lift system 65 on a face directed towards the runner rail 11, disposed between the runner rail 11, in particular a bottom belt, and the bogie assembly 7, in order to prevent the mast 2 from tipping over should it assume an inadmissible crooked position. The bracket-type anti-lift system 65 engaging round at least certain regions of the runner rail 11 is secured to the bogie assembly 7 by its base so as to be immobilised, and free bracket end regions 66 are provided with support elements 67, such as skids, wheels. When the mast 2 is oriented in the vertical direction, the support elements are disposed at a distance from the guide track parts 32, whereas if the mast 2 assumes an inclined position that is essentially not permissible, the support elements 67 move into abutment on the guide track parts 32 and hold the mast 2 in a secured position.

As illustrated in FIG. 2, the to bogie assembly 8 is also fitted with at least one anti-lift system 65, which is arranged between the top guide track or the top runner rail 12 formed by it, in particular a top belt, and the top bogie assembly 8. The top anti-lift system 65 is intended to prevent the mast 2 from lurching over should it assume a crooked position and holds it secure in its crooked position. As described above, the anti-lift system 65 has support elements 67 in the bracket end regions 66.

Figure 7:
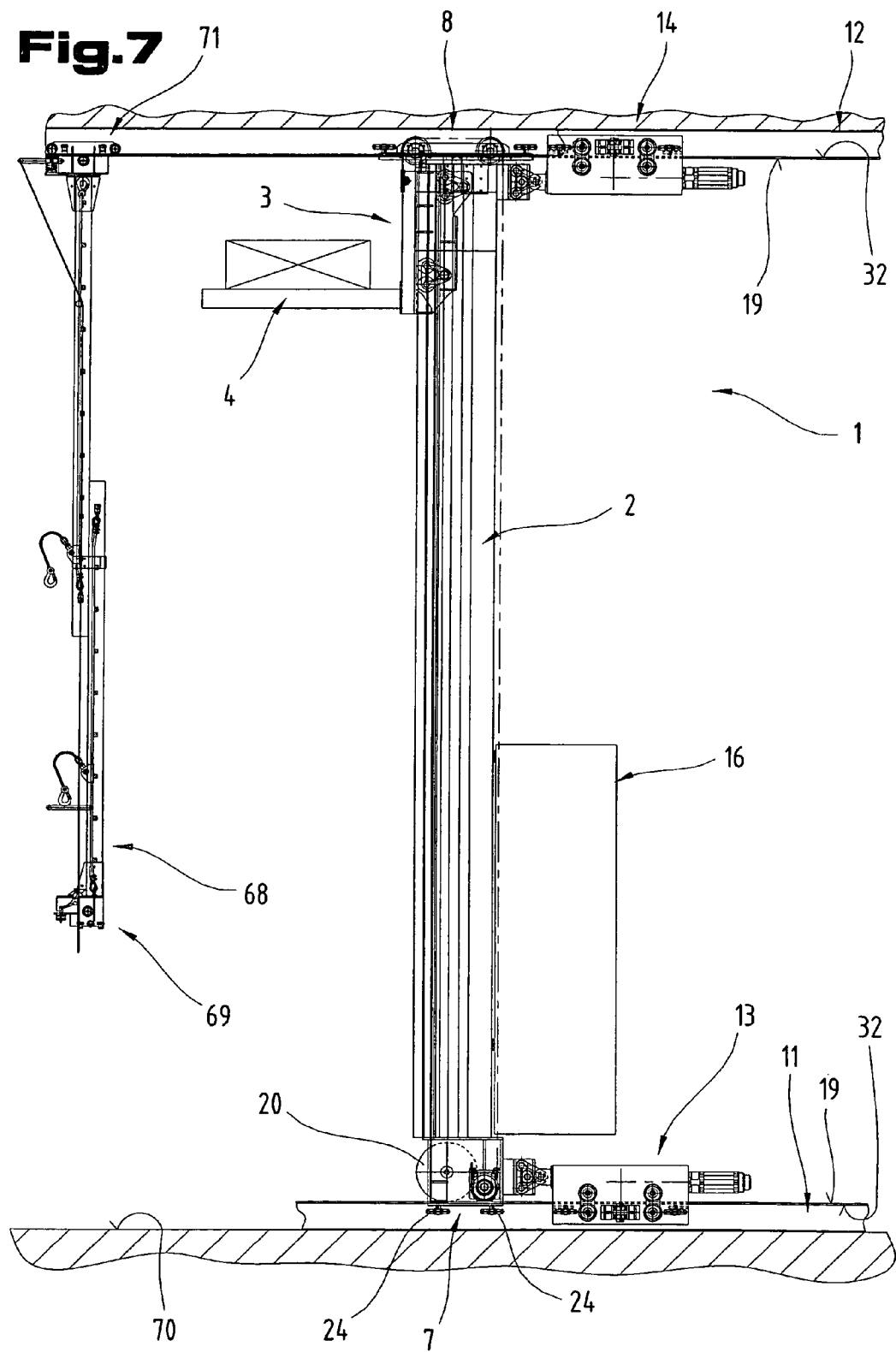
FIG. 7 is a highly simplified, schematic diagram showing a side view of the rack serving device and a ladder which can be displaced towards the rack serving device on at least one runner track for the purpose of carrying out maintenance work.

FIG. 7 shows a side view of the rack serving device 1, which is displaceable along the bottom and top guide track or runner rail 11, 12, guided in the height direction and at the side, the individual units of which, such as bogie assemblies 7, 8, adjusting mechanisms or displacement drives 13, 14 etc., are the same as those described in respect of the earlier drawings. As may be seen from this diagram, at least one ladder 68 which is displaceable along at least one, preferably the top runner rail 12 and is guided in the height direction and at the side, can be moved into position relative to the rack serving device 1 for maintenance purposes and for repair work. The ladder 68 is preferably length-adjustable and is supported and secured by means of an extractable or pivoting support apparatus 69 on a floor 70 of a building. In order to provide height and lateral guidance, the ladder 68 has at least one ladder bogie assembly 71 at its top end with height and lateral guide elements. Although not illustrated, it would naturally also be possible for the ladder to extend across the entire height of the mast 2, in which case it could by supported on the top and bottom runner rail 11, 12 and guided along this runner rail 11, 12 in the height direction and to the side by means of both a bottom and top ladder bogie assembly 71. During operation of the rack serving device 1, the ladder 68 is stowed away in a stand-by region externally to a pre-definable working space of the rack serving device 1, the stand-by position of the ladder 68 being monitored by means of at least one sensor system provided in the stand-by region specifically for this purpose. When the rack serving device 1 is switched off, the ladder 68 can be brought alongside the rack serving device 1 and can be releasably locked in this position by means of mechanical and/or electric and/or pneumatic and/or hydraulic locking elements so that it is docked on the rack serving device 1 or secured in position relative to the floor 70 and/or the runner rail 11; 12 by means of brake and locking mechanisms provided on the ladder 68. The ladder 68 can be manually displaced along the runner rail 11; 12 or automatically or remotely controlled by providing at least one drive element on at least one of the ladder bogie assemblies 71. Ladders 68 of this type are already generally known from the prior art and are provided with all the safety features needed for this application.

Figure 8:
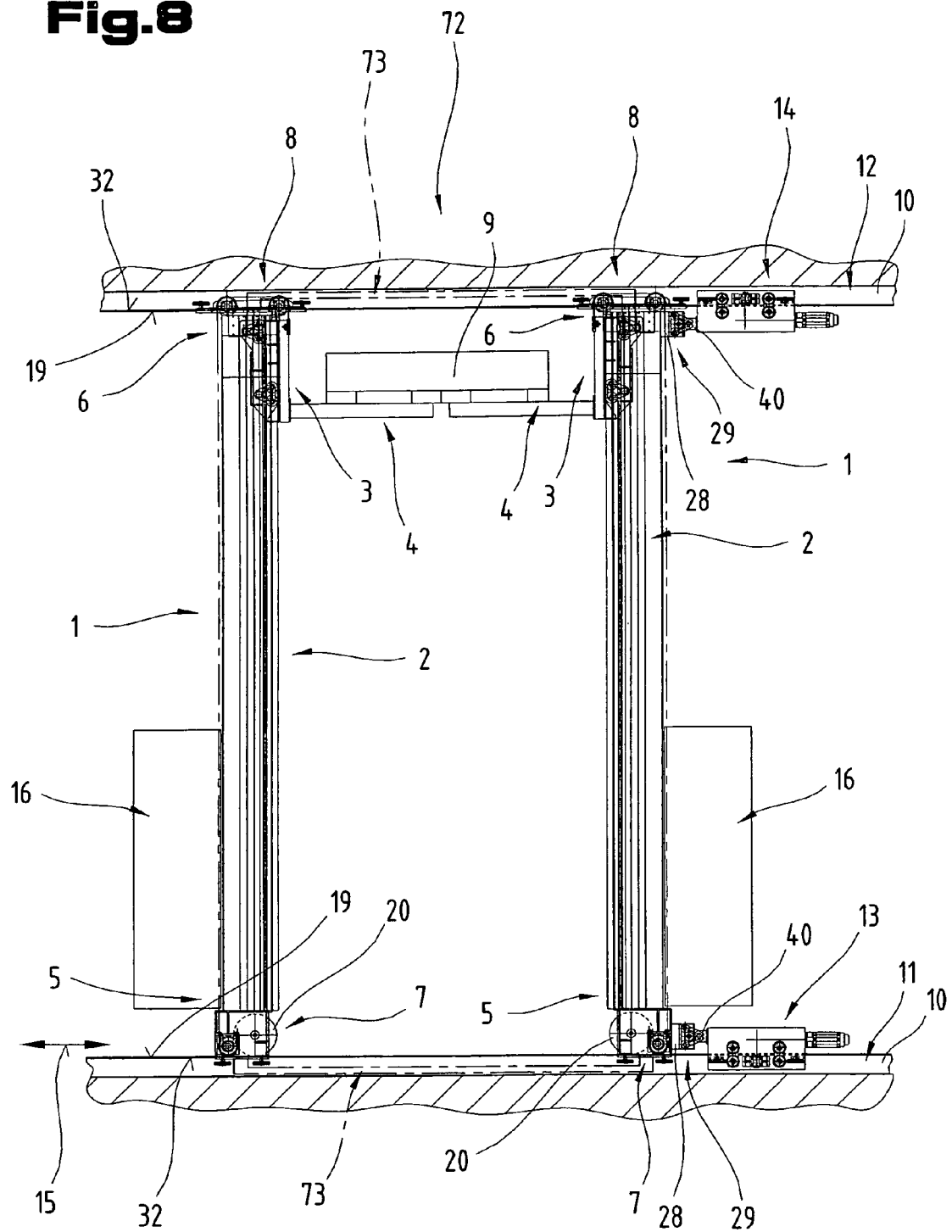
FIG. 8 is a highly simplified, schematic diagram showing a side view of one possible way of integrating several rack serving devices to form one racking rack serving unit.

FIG. 8 is a highly simplified, schematic diagram illustrating a side view of an example of a system in which a plurality of rack serving devices 1 are combined to form one assembled rack serving unit 72. The rack serving unit 72 is made up of several rack serving devices 1 arranged one after the other and actively connected to one another. The rack serving devices 1 spaced at a distance apart from one another in the aisle direction—indicated by double arrow 15—are connected to one another, preferably so that they can be released, by means of support frames 73 provided between the masts 2, in particular their bottom and top bogie assemblies 7, 8. The support frames 73 are schematically indicated by dotted-dashed lines. Two rack serving devices 1 are expediently arranged on the guide tracks or runner rails 11, 12 in such a way that their load-bearing means 4 are directed towards one another, which means that they are able to accommodate a load 9 with a large surface area, such as a pallet. The two rack serving devices 1 are guided on the guide track parts 10, 19, 32 of the guide tracks or runner rails 11, 12 by their bogie assemblies 7, 8 and at least one of the rack serving devices 1 is provided with at least one coupling part 28 for transmitting or applying a forward motion to the rack serving unit 72. Consequently, the rack serving unit 72 has only one, preferably the bottom, displacement drive 13. As may be seen from this drawing, the rack serving unit 72 expediently has both displacement drives 13, 14. Naturally it would be possible to align any number of rack serving devices 1, releasably connected to one another, to form a large rack serving unit 72.

Naturally, the rack serving devices 1 could also be disposed so that their load-bearing means 4 extend in opposite directions from one another.

In another variant, which is not illustrated, several rack serving devices 1 are held together at a pre-definable distance from one another and/or are displaced at a pre-definable distance from one another and an automatic control system activating the displacement drives 13, 14 is provided in order to control the unit on the basis of a programme. Naturally, it would also be possible for several rack serving devices 1 to be moved freely and simultaneously, remotely controlled by the control system, in which case a minimum distance will be maintained between the rack serving devices 1 in order to avoid collisions.

As illustrated in FIG. 1, the rack serving device 1 can be fitted with at last one position detection system 74, which is mounted on the mast 2 and/or on the bogie assembly 7, 8 and/or on the displacement drive 13, 14 and/or on the load-bearing means 4, for example. Such a position detection system 74 may be a navigation device, in particular GPS, consisting of a transmitter and/or receiver unit 75 on the rack serving device 1, and a transmitter and/or receiver unit, not illustrated, in a pre-definable working area. The advantage of using a position detection system 74 of this type is that a position of the rack serving device 1 and/or the position and/or a distance of the load-bearing means 4 relative to a racking system and/or a rack shelf can be detected on the basis of the associated X-Y coordinates. These co-ordinates, or data such as the speed curve, can be forwarded to the control system in the control cabinet 16 and/or to a central control system of a warehouse administration computer for further processing and/or output.

At least one image-processing element, in particular a CCD camera, may also be mounted on one or more points of the rack serving device 1, such as in the region of the lift carriage 3 and/or the bogie assemblies 7, 8 and/or the displacement drives 13, 14, for the purpose of monitoring various states, such as wear on the bogie assemblies 7, 8 and/or the displacement drives 13, 14 or for monitoring the process of storing and retrieving the loads 9 in the rack shelves, etc. The detected data and images are also forwarded to the control system in the control cabinet 16 and/or to a central control system and evaluated. This will enable maintenance and repair data or diagnoses to be established. Commands and/or data and/or signals are transmitted by means of lines, preferably run substantially through the interior of the mast 2, and/or by contactless means, such as an ultrasound or infrared transmission, to the control system.

Another function of the control system is to maintain the mast in its substantially vertical position, for which purpose highly dynamic tracking controls of the drive motors of the displacement drives 13, 14 are used. To this end, the bottom and top drive motors have substantially the same power rating so that any horizontal deviation of the mast foot 5 and mast head 6 from their position can be kept as low as possible under all operating and load conditions. The function of the tracking controls is to keep the rack serving device 1 with the mast in a preferably vertical position under all operating conditions.

To this end, a reference line is defined by two points on a bearing surface of the load-bearing means 4, which is horizontally oriented when the mast 2 is in the vertical position. If the mast 2 deviates from its vertical position, the inclination of the reference line changes and this is detected by means of at least one sensor system 76 disposed on the load-bearing means 4, such as a levelling device for example. The change in inclination is transmitted to the control system, where appropriate control algorithms compare the constantly detected actual value with a pre-definable desired value for the inclination and adapt it to the desired value by activating the drive system 33 of the bottom and/or top displacement drive 13; 14. The driving torque of the top displacement drive 14 is changed, preferably until the load-bearing means 4 is horizontally aligned. Levelling the load-bearing means 4 also returns the mast 2 to a substantially vertical orientation because the load-bearing means 4 is mounted on the mast 2 in such a way that it can be guided in terms of its height and at the side virtually without any clearance by means of the lift carriage.

The sensor system 76 may also serve as the position detection system 74. Alternatively, it would also be possible to detect the actual values for the respective travel of the mast foot 5 and mast head 6 on the bottom and top runner rail 11, 12. The control system constantly compares the travel actual values with the respective pre-set desired values for the travel. If there is a deviation from the travel desired values, the actual values are automatically adapted to the desired values for this travel by adjusting the driving torque of a displacement drive 13; 14, preferably the top displacement drive 14.

In order to ensure that slip between the drive rollers 37 and the runner rails 11, 12 is kept low, even when handling heavy loads 9, a weight measuring system may be provided on the lift carriage 3 or load-bearing means 4, in particular a weighing cell, force measuring unit, etc., by means of which the weight of the load 9 is determined, so that an automatic control unit can adjust a variable contact force of the drive rollers 37 and/or contact elements 36 of the displacement drives 13, 14 and/or the inclination of the load-bearing means 4 is adjusted by changing the position of the displacement drives 13, 14 disposed one above the other depending on the currently acting torque. The contact force and the inclination of the load-bearing means 4 may be adjusted by means of the mechanical and/or electromechanical coupling connection 27 constituting the coupling mechanism 29, in particular actuator elements, such as a threaded spindle, for example.

Figure 9:
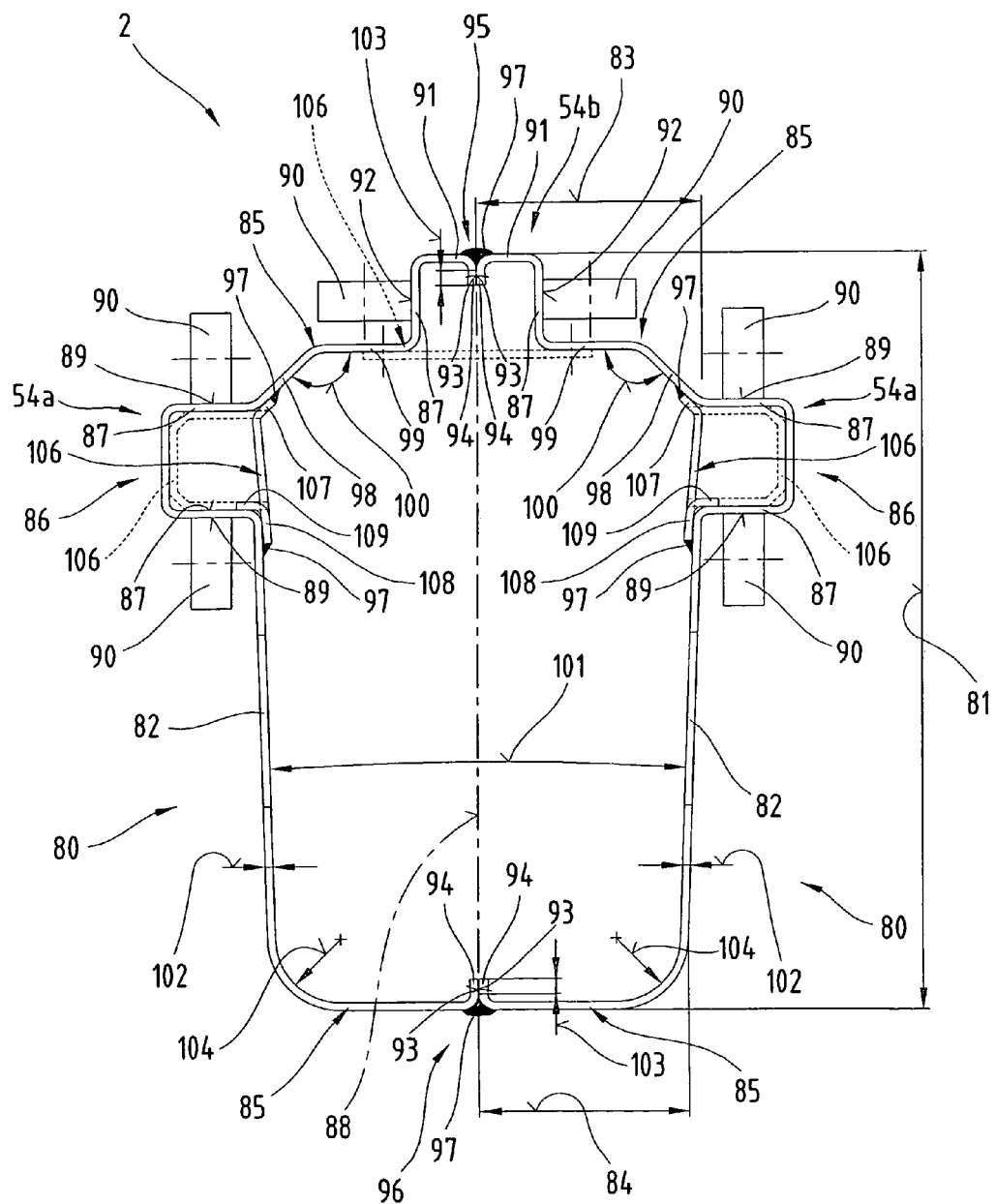
FIG. 9 shows a cross section through a mast with the lateral guide elements of the lift carriage lying against the guide tracks.

FIGS. 9 and 12, which will be described together, illustrate different views of the mast 2 for the rack serving device 1, which is not illustrated in this drawing. By preference, the lift mechanism 52 and the rack serving device 1 of the mast 2 are the same as the rack serving device 1 and lift mechanism 52 described in connection with the diagrams given in FIGS. 1-8.

The design and manufacture of this mast 2 does not depend on the design of the lift mechanism 52 and the rack serving device 1 and may be construed as the object of a separate, independent patent.

Above all, this independent embodiment of the mast 2 achieves the preferably independent objective of providing a mast 2 for the rack serving device 1 which is specifically made and designed to improve the capacity to withstand prevailing static and dynamic stress and can also be used for both high static and/or dynamic loads.

The mast 2 is made from two assembled substantially half-shell elongate sections 80 with a substantially C-shaped cross section. A width 81 of a base 82 of the elongate sections 80 is bigger than a height 83, 84 of the legs 85, which extend essentially perpendicular thereto. As may be seen from FIG. 9, the width 81 is longer than the maximum height 83 of the elongate sections 80. The mast 2, which is made from two elongate sections 80 joined to one another to form a hollow section, is cruciform in cross section and has outwardly directed, substantially U-shaped protuberances 86 on oppositely lying faces, extending in the longitudinal direction of the mast 2 with section strips standing proud of the base 82 of the elongate sections 80. Each of the U-shaped protuberances 86 extending along the entire mast length, in particular the section strips 87, forms a running surface 89 in planes extending perpendicular to a plane of longitudinal symmetry 88 for the running wheels 90 of the lift carriage 3 forming lateral guide elements, which can be displaced on the mast 2, although this is not illustrated in this drawing. The protuberances 86 therefore form guide tracks 54*a* on oppositely lying width faces of the mast 2 in the longitudinal direction for the running wheels 90 forming the lateral guide elements 53.

Each of the substantially C-shaped elongate sections 80 forms a substantially L-shaped projection 91 at one of its free ends, which, on a first face remote from the plane of symmetry 88, forms a running surface for the lateral guide element 53 or running wheel 90 of the lift carriage 3 displaced and guided on the mast 2, and another surface directed towards the plane of longitudinal symmetry 88 which serves as a support and/or joint surface 93. When the elongate sections 80 are assembled, the two projections 91 form the other guide track 54*b* and running surfaces 92 disposed at a right angle to the guide tracks 54*a* on a slim face of the mast 2 and extending along the entire mast length. The running surfaces 92 of the projections 91 extending in the longitudinal direction of the mast 2 and standing proud of the legs 85 of the elongate section 80 extend parallel with one another and parallel with the plane of longitudinal symmetry 88. At their free ends, the substantially L-shaped projections 91 have upstanding longitudinal edges 94 forming the support and/or joint surfaces 93 extending parallel with the plane of longitudinal symmetry 88, which butt with one another in the connecting region 95 to form a hollow fillet between the two elongate sections 80 to be joined to one another.

At their free ends lying opposite the projections 91, the legs 85 of the elongate sections 80 have longitudinal edges 94 disposed substantially parallel with the plane of longitudinal symmetry 88 and forming the support and/or joint surfaces 93, which butt with one another in the joint region 96 to form a hollow fillet between the two elongate sections 80 to be joined to one another. The join between the elongate sections 80 in the two joint regions 95, 96 along the hollow fillet is preferably provided in the form of a welded seam 97 extending along the entire mast length.

The section parts 98 of the legs 85 of the elongate sections 80 between the protuberances 86 and the projections 91 extend at an angle towards one another in the direction of the width 81 and taper the farther away they are from the protuberances 86 in the direction of the projections 91 up to the section parts 99 disposed perpendicular to the plane of longitudinal symmetry 88, where they are adjoined by the running section strips 87 of the projections 91 disposed perpendicular to the section parts 99 and provided with the running surfaces 92. An angle 100 subtended by the section parts 98, 99 is between 90° and 160°, in particular between 110° and 140°, for example 135°. As may also be seen from FIG. 9, the base 82 of the elongate sections 80 extends at an incline relative to the plane of longitudinal symmetry 88, tapering the farther away they are from the protuberances 86 in the direction of the legs 85 extending perpendicular to the plane of longitudinal symmetry 88. The angle 101 between the base 82 of the two elongate sections 80 is between 5° and 25°, in particular between 8° and 18°, for example 10°.

The elongate sections 80 are of a symmetrical design and have a wall thickness 102 which is substantially constant throughout their cross section, which is between 3 mm and 6 mm, for example 4 mm. A bridging width 103 of the abutting longitudinal edges 94 of the two elongate sections 80 extending parallel with one another in the same plane preferably corresponds to at least three times the wall thickness 102 and is, for example, between 9 mm and 18 mm, for example 12 mm. Between the base 82 and the leg 85 is a rounded region with a radius 104 of between 40 mm and 80 mm, in particular 50 mm and 70 mm, for example 60 mm.

On their base 82, the elongate sections 80 have slot-shaped cutouts 105 disposed in a row one after the other in the mast longitudinal direction, the primary purpose of which is to facilitate the mounting and running of power lines inside the mast 2 for example, because these cutouts 105 provide access to the interior of the mast 2 using a tool.

In order to satisfy the requirements of being able to withstand high static and dynamic stress, such as torsion, bending stress, etc., even if the wall thickness 102 is slim, the open end of the substantially U-shaped protuberances 86 facing the interior of the mast 4 is closed off respectively with at least one strip-type stiffening element 106 overlapping with the lateral abutting regions of the protuberances 86, as described in connection with FIGS. 11 and 12, or the abutting regions are joined to one another by at least one stiffening element 106. The stiffening element 106 has a first side edge 107 extending parallel with and sitting flat against the leg 85, in particular with the section part 98 of the elongate sections 80, and another side edge 108 extending parallel with the base 82 and sitting flat against the elongate sections 80, and optionally at least two laterally protruding positioning projections 109 on one of the side edges 108 spaced at a distance apart from one another in the longitudinal direction of the stiffening element 106, extending parallel with the one section strip 87 and sitting flat against it.

The stiffening elements 106 expediently extend along the entire mast length and are joined in a positive fit by means of two continuous weld seams 97 extending between the side edges 107, 108 and the legs 85 as well as between the base 82 of the elongate sections 80 and the elongate sections 80. Alternatively, it would also be possible to provide strip-like stiffening elements 106 immediately one after the other along the entire mast length, either abutting with one another or separated from one another by a vertical distance, each of which is joined along the length of the stiffening element 106 by continuously extending weld seams between the side edges 107, 108 and the legs 85 and between the base 82 and the elongate sections 80.

Naturally, it would also be possible for the join between the elongate sections 80 in the joint regions 95, 96 and/or in the joint regions between the stiffening elements 106 and the elongate sections 80 to be provided in several sections in the form of mutually separate weld seams. However, the embodiment with continuous weld seams 97 along the entire mast length in the joint regions 95, 96 and between the stiffening elements 106 and the elongate sections 80 is the preferred variant.

As schematically indicated by broken lines in FIG. 9, the stiffening elements 106 may also be adapted to match the protuberances 86 with the substantially U-shaped cross section, in which case they will also have a substantially U-shaped cross section. This embodiment further increases the capacity to withstand mechanical stress because the legs and/or the base of the stiffening elements 106 are advantageously supported on at least certain regions of the internal contour of the protuberances 86. Alternatively, as also indicated by broken lines in FIG. 9, at least one strip-type stiffening element 106 may also be provided between the L-shaped projections 91, joined to one another to form a substantially U-shaped guide track 54b on an open face of the guide track 54b directed towards the protuberances 86, overlapping with the side regions adjoining the projections in the longitudinal direction of the mast 2. The at least one stiffening element 106 is permanently joined by means of a connecting element, e.g. a screw connection, a welded joint, a rivet joint, etc., to the two legs 85 of the elongate sections 80. Naturally, it would also be possible to provide several stiffening elements 106 one after the other in the longitudinal direction of the mast 2, in which case each of the stiffening elements 106 would be joined by means of the joining element 106 to the elongate sections 80 and/or have more or less the same cross-sectional shape as the guide track 54b. Providing this additional stiffening element 106 will enable the mast 2 to cope with high loads in particular.

A thickness 110 of the stiffening elements 106 preferably corresponds to the wall thickness 102. In order to increase the capacity of the mast 2 to withstand mechanical stress, the stiffening elements 106 could also have a thickness 110 that is a multiple of the wall thickness 102, for example twofold. Cutouts 111 could also be provided in the stiffening element 106 to facilitate assembly and/or the running of power cables, for example, as described in more detail above, in which case these are arranged in a row one after the other in the longitudinal direction of the stiffening element 106.

The elongate sections 80 illustrated in the various drawings are made from a flat piece cut from sheet steel made by a rolling process or an internal high-pressure forming process and provided with a zinc coating with a thickness of for example 5 μm to 20 μm, for example 10 μm, on their internal and/or external surfaces. The two elongate sections 80 are firmly joined to one another by means of a metal inert gas welding process (MIG welding) or an arc welding process. The weld may contain an additional material in the form of an added substance with a copper base, e.g. CuSi3MnAl. The elongate sections 80 are made from steel, in particular a fine-grained construction steel.

The surprising advantage of welding is that only a low amount of heat is introduced during the welding process, which means that the zinc layer is essentially hardly reduced at all and the slight burning of the zinc which occurs at the side of the weld seams 97 has virtually no effect on corrosion resistance because the cathodic distance protecting effect is also maintained in the joint regions 95, 96 between the elongate sections 80 and between the stiffening elements 106 and the elongate sections 80.

Another advantage is the fact that it is a simple matter to make the mast 2 from the two elongate sections 80 because the elongate sections 80, made by the preferred rolling process, are already made to their ultimate dimensions, after which each of the elongate sections 80 is placed in a device and fixed in position. The stiffening elements 106 are then placed on the elongate section 80 in the region of the protuberances 86 and positioned by means of the positioning projections 109 relative to the protuberance 86 in the direction extending parallel with the plane of longitudinal symmetry 88 and by means of the inclined longitudinal edge 107 extending parallel with the section part 98 in the direction extending perpendicular to the plane of longitudinal symmetry 88 so that they can then be positively joined to the elongate sections 80 in the regions adjoining the protuberances 86. The two elongate section 80 are then aligned in their desired relative position and placed one against the other by their mutually facing support and/or joint surfaces 93 extending parallel with one another in the same plane and parallel with the plane of longitudinal symmetry 88 and welded to one another at their hollow fillet formed by the mutually abutting longitudinal edges 94 of the two elongate sections 80. After joining the two elongate sections 80, at least one strip-shaped stiffening element 106 can then be optionally placed in position between the projections 91 on an open side of the guide track 54*b* facing the protuberances 86 and joined to the elongate sections 80 from the exterior, by means of blind rivets, screws, a weld seam, for example.

It is of particular advantage that the manufacturing tolerances of the elongate sections 80 made in a single piece from a flat cutting in a rolling process, are compensated in the joint regions 95, 96 between the two elongate sections 80 and between the stiffening elements 106 and the elongate sections 80 by the added material, the solidified weld seam 97 being of a higher strength than the elongate sections 80.

For the sake of good order, it should finally be pointed out that in order to provide a clearer understanding of the structure of the rack serving device 1, it and its constituent parts are illustrated to a certain extent out of scale and/or on an enlarged scale and/or on a reduced scale.

The underlying objectives to the solutions proposed by the invention may be found in the description.

Above all, the individual embodiments of the invention illustrated in FIGS. 1, 2, 3; 4; 5; 6; 7; 8; 9, 10, 11, 12 may be construed as independent solutions proposed by the invention in their own right. The associated objectives and solutions may be found in the detailed descriptions of these drawings.

| List of reference numbers | |
| --- | --- |
| 1 | Rack serving device |
| 2 | Mast |
| 3 | Lift carriage |
| 4 | Load-bearing means |
| 5 | Mast foot |
| 6 | Mast head |
| 7 | Bogie assembly (bottom) |
| 8 | Bogie assembly (top) |
| 9 | Load |
| 10 | Guide track part |
| 11 | Runner rail (bottom) |
| 12 | Runner rail (top) |
| 13 | Displacement drive (bottom) |
| 14 | Displacement drive (top) |
| 15 | Double arrow |
| 16 | Control cabinet |
| 17 | Web |
| 18 | Top belt |
| 19 | Guide track part |
| 20 | Height guide element |
| 21 | Rotations axis |
| 22 | Surrounding frame |
| 23 | Side wall |
| 24 | Lateral guide element |
| 25 | Rotation axis |
| 26 | Rear wall |
| 27 | Coupling connection |
| 28 | Coupling part |
| 29 | Coupling mechanism |
| 30 | Height guide element |
| 31 | Lateral guide element |
| 32 | Guide track part |
| 33 | Drive system |
| 34 | Axis |
| 35 | Rotations axis |
| 36 | Contact element |
| 37 | Drive roller |
| 38 | Housing |
| 39 | Support frame |
| 40 | Coupling part |
| 41 | Jaw part |
| 42a | Articulation axis |
| 42b | Articulation axis |
| 43 | Guide element |
| 44 | Longitudinal guide |
| 45 | Guide track |
| 46 | Runner |
| 47 | Leg |
| 48 | Base |
| 49 | Wiper bar |
| 50 | Return element |
| 51 | Guide element |
| 52 | Lift mechanism |
| 53 | Height and lateral guide element |
| 54a | Guide track |
| 54b | Guide track |
| 55 | Drive mechanism |
| 56 | Linkage point |
| 57 | Distance |
| 58 | Linkage point |
| 59 | Lift motor |
| 60 | Drive element |
| 61 | Double arrow |
| 62 | System |
| 63 | Energy field |
| 64 | Induction system |
| 65 | Anti-lift system |
| 66 | Bracket end region |
| 67 | Support element |

-continued

| | List of reference numbers |
|---|---|
| 68 | Ladder |
| 69 | Support apparatus |
| 70 | Floor |
| 71 | Ladder bogie assembly |
| 72 | Rack serving unit |
| 73 | Support frame |
| 74 | Position detection system |
| 75 | Transmitter and/receiver unit |
| 76 | Sensor system |
| 77 | |
| 78 | |
| 79 | |
| 80 | Elongate section |
| 81 | Width |
| 82 | Base |
| 83 | Height |
| 84 | Height |
| 85 | Leg |
| 86 | Protuberance |
| 87 | Section strips |
| 88 | Plane of longitudinal symmetry |
| 89 | Running surface |
| 90 | Running wheel |
| 91 | Projection |
| 92 | Running surface |
| 93 | Support and/or joint surface |
| 94 | Longitudinal edge |
| 95 | Joint region |
| 96 | Joint region |
| 97 | Weld seam |
| 98 | Section part |
| 99 | Section part |
| 100 | Angle |
| 101 | Angle |
| 102 | Wall thickness |
| 103 | Bridging width |
| 104 | Radius |
| 105 | Cutout |
| 106 | Stiffening element |
| 107 | Side edge |
| 108 | Side edge |
| 109 | Positioning projection |
| 110 | Thickness |
| 111 | Cutout |

The invention claimed is:

1. Rack serving device (1) with a lift carriage (3) incorporating load-bearing means (4), whereby the mast (2) is guided on bottom and top tracks by means of bogie assemblies (7, 8) mounted at its mast foot (5) and mast head (6), and a displacement mechanism acting by means of a friction lock and displaceable along the bottom guide track serves as a bottom displacement drive (13) and a displacement mechanism acting by means of a friction lock and displaceable along the top guide track serves as a top displacement drive (14), the bottom and top displacement mechanisms being guided on the guide tracks by means of height and lateral guide elements (20, 24) and displaceable relative to the guide tracks by means of a drive system (33) with at least one drive roller (37), and the displacement mechanisms are drivingly connected to the mast (2), wherein a coupling mechanism (29) is provided respectively between the guided, displaceable displacement drives (13, 14) and bogie assemblies (7, 8), comprising at least two coupling parts (28, 40) displaceable towards one another perpendicular to the longitudinal extension of the guide track, and at least one coupling connection (27) extending between the articulation axes (42a, 42b) of the coupling parts (28, 40), which are mounted so as to pivot about the articulation axes (42a; 42b) substantially perpendicular to the longitudinal extension of the guide track relative to a coupling part (28; 40), and to slide at an end region remote from these articulation axes (42a; 42b) by means of a longitudinal guide (44) in a direction substantially parallel with the longitudinal extension of the mast (2).

2. Rack serving device as claimed in claim 1, wherein the first coupling part (28) is disposed on the mast (2) in the region of the mast foot (5) and mast head (6) and the other coupling part (40) is disposed on the displacement drive (13, 14), and the coupling connection (27) extends between the coupling parts (28, 40) and is articulatingly linked to them.

3. Rack serving device as claimed in claim 2, wherein the first mast-side coupling part (28) is offset transversely to the horizontal guide track part (19) of the guide track in the direction towards the mast foot (5) or in the direction away from the mast foot (5).

4. Rack serving device as claimed in claim 3, wherein the height guide elements (30) are disposed so that they can roll on guide track parts (19, 32) and contact elements (36) which can be pressed against the guide track parts (32, 19) are provided in the form of height guide rollers and pressure rollers rotating about axes (34) extending transversely to the longitudinal extension of the runner rails (11, 12), and the adjacent rolling lateral guide elements (31) are provided in the form of lateral guide rollers rotating about rotation axes (35) extending perpendicular to the aisle direction (15) and the longitudinal extension of the runner rails (11, 12).

5. Rack serving device as claimed in claim 2, wherein the first mast-side coupling part (28) is offset transversely to the guide track part (19) of the guide track in the direction of the mast head (6) or in the direction away from the mast head (6).

6. Rack serving device as claimed in claim 1, wherein the bottom and top guide track are provided in the form of a bottom and top runner rail (11, 12) with a preferably I-shaped cross section, and at least one height guide element (20) and lateral guide elements (24) of a guide mechanism of the bottom bogie assembly (7) lie against a horizontal guide track part (19) of a top belt (18) and against a vertical guide track part (10) of a web (17) of the bottom runner rail (11), and lateral guide elements (24) of a guide mechanism of the top bogie assembly (8) sit against a vertical guide track part (10) of a web (17) of the top runner rail (12).

7. Rack serving device as claimed in claim 1, wherein each of the displacement drives (13, 14) co-operates with at least two pairs of height guide elements (30) spaced at a distance apart from one another in the aisle direction (15) on either side of the web (17) of the preferably I-shaped runner rails (11, 12) lying against mutually remote guide track parts (19, 32) of the bottom and top runner rail (11, 12), and has at least one contact element (36) lying against mutually remote guide track parts (32, 19) of the bottom and top runner rail (11, 12) and at least two pairs of lateral guide elements (31) spaced at a distance apart from one another in the aisle direction (15) lying against oppositely lying guide track parts (10) of the web (17).

8. Rack serving device as claimed in claim 7, wherein the displacement drives (13, 14) have at least one driven drive roller (37) and at least one follower wheel or another driven drive roller (37), which are respectively applied against the oppositely lying guide track parts (10) of the webs (17) of the runner rails (11, 12), and the drive roller (37) and the follower wheel or the other drive roller (37) is disposed between the height guide elements (30) arranged one after the other.

9. Rack serving device as claimed in claim 1, wherein the height and lateral guide elements (30, 31) of the displacement drives (13, 14) are provided in the form of guide bars which can be pressed against the guide track parts (19, 32, 10) of the runner rails (11, 12) with a pre-definable contact force.

10. Rack serving device as claimed in claim 1, wherein the height and/or lateral guide elements (30, 31) of the displacement drives (13, 14) are respectively disposed on a common support frame and the height and/or lateral guide elements (30, 31) can be pressed against the guide track parts (19, 32, 10) of the runner rails (11, 12) due to the effect of at least one pressing force acting on the support frame.

11. Rack serving device as claimed in claim 1, wherein the high and lateral guide and contact elements (20, 24; 30, 31, 36) of the bogie assemblies (7, 8) and displacement drives (13, 14) are made from elastomers, preferably thermoplastic materials, or from steel enclosed in a plastic sheath.

12. Rack serving device as claimed in claim 1, wherein the mast (2) is essentially vertically aligned and the bottom and top displacement drives (13, 14) are preferably arranged one above the other on a rear face of the mast (2).

13. Rack serving device as claimed in claim 1, wherein the displacement drives (13, 14) and the mast (2) with the bogie assemblies (7, 8) respectively form a single unit and the bogie assemblies (7, 8), to which a forward motion can be transmitted via the coupling part (28), are connected to the displacement drives (13, 14), preferably releasably.

14. Rack serving device as claimed in claim 1, wherein the non-driven bogie assemblies (7, 8) are constituted by the mast (2) or are rigidly connected to the mast foot (5) and mast head (6).

15. Rack serving device as claimed in claim 1, wherein the bogie assemblies (7, 8) each have a runner (46) which can be displaced in a pivoting motion about a mid-axis extending transversely to the aisle direction (15), and the runner (46) at least partially engaging round the runner rails (11, 12) has a U-shaped cross section and has lateral guide elements (24), preferably on its legs (47) extending parallel with the web (17), which lie against the guide track parts (10) of the webs (17).

16. Rack serving device as claimed in claim 15, wherein the runner (46) of the bogie assemblies (7, 8) supporting the lateral guide elements (24) can automatically be returned to a predefined horizontal position by means of mechanically and/or electrically and/or hydraulically and/or pneumatically operated means, in particular return elements (50), if the mast (2) assumes a crooked position.

17. Rack serving device as claimed in claim 15, wherein a base (48) extending between the legs (47) is fitted with at least one wiper bar (49) on its bottom face directed towards the guide track part (19) which is adapted to the guide track part (19) and sits against it, which is capable of generating a contact force in the direction of the runner rail (11, 12).

18. Rack serving device as claimed in claim 17, wherein elastic return elements (50) are spaced at a distance apart from one another between the base (48) and wiper bar (49) and on either side of the transverse mid-axis thereof, and the wiper bar (49) is pivotable about its transverse mid-axis, the wiper bar (49) being made from wear-resistant plastic such as polytetrafluoroethylene, polyamide.

19. Rack serving device as claimed in claim 1, wherein the displacement drives (13, 14) are linked, preferably releasably, via the coupling mechanism (29) to the mast foot (5) and mast head (6) and/or the bogie assemblies (7, 8) without any clearance in the aisle direction (15).

20. Rack serving device as claimed in claim 1, wherein the coupling mechanisms (29), guided and displaceable on the runner rails (11, 12) between the bogie assemblies (7, 8) and displacement drives (13, 14) arranged one after the other in the aisle direction (15), and/or the displacement drives (13, 14, themselves are designed to compensate for deviations in the linearity of the rectilinear guide tracks.

21. Rack serving device as claimed in claim 1, wherein the height and lateral guide elements (30, 31) and drive rollers (37) and contact elements (36) of the displacement drives (13, 14) are disposed on a guide carriage which can be displaced along a guide mechanism transversely to the aisle direction (15) and runner rails (11, 12), and the guide carriage is designed to be displaceable relative to a housing (38) of the displacement drive (13, 14).

22. Rack serving device as claimed in claim 1, wherein the rod-like or fork-like coupling connection (27) has at least two articulation axes (42a, 42b).

23. Rack serving device as claimed in claim 22, wherein the coupling mechanism (29) is linked via a first mast-side articulation axis (42a) to at least one coupling part (28) rigidly coupled with the mast (2), in particular with the bogie assembly (7, 8), so that it can be displaced in a pivoting motion, and is linked to at least one coupling part (40) rigidly coupled with the displacement drive (13, 14) via another drive-side articulation axis (42b).

24. Rack serving device as claimed in claim 1, wherein the coupling mechanism (29) has at least one, preferably two, coupling connections (27) spaced at a distance apart from one another, the mounted so as to pivot about the drive-side coupling parts (40), in particular jaw parts (41), which are preferably triangular in shape.

25. Rack serving device as claimed in claim 24, wherein, at its end regions facing the bogie assembly (7, 8), the jaw part (41) has mounted on it a rotatable guide element (43) and, relatively displaceable to it, at least one other guide element (43), essentially in the region of a centre of gravity of the jaw part (41).

26. Rack serving device as claimed in claim 1, wherein the coupling part (28) has two section-type longitudinal guides (44) spaced at a distance apart from one another with guide tracks (45) formed thereby, which complement the guide elements (43) on the jaw parts (41) in order to guide the mast (2) in its longitudinal direction.

27. Rack serving device as claimed in claim 1, wherein the coupling connection (27) is of a fork-type or rod-type elbow rod or a mechanically and/or electrically controllable actuator drive, in particular a length-adjustable threaded spindle drive.

28. Rack serving device as claimed in claim 1, wherein an anti-lift device (65) is disposed respectively between the mast foot (5) and the bottom runner rail (11) and between the mast head (6) and the top runner rail (12).

29. Rack serving device as claimed in claim 28, wherein the bogie assembly (7, 8) is fitted with a bracket-shaped anti-lift device (65) which engages around certain regions of the runner rail (11, 12) and is provided with support elements (67) at its free bracket end regions (66), such as skids, wheels, and if the mast (2) assumes a crooked position exceeding a pre-set threshold value, the support elements (67) are supported on the mutually remote guide track parts (32) of the bottom and top runner rails (11, 12).

30. Rack serving device as claimed in claim 1, wherein at least one position detection system (74) is assigned to the rack serving device (1), in particular the mast (2) and/or the bogie assemblies (7, 8) and/or the displacement drives (13, 14) and/or the load-bearing means (4).

31. Rack serving device as claimed in claim 30, wherein the position detection system (74) is provided in the form of a navigation device, in particular GPS, consisting of a transmitter and/or receiver unit (75) on the rack serving device (1) and a transmitter and/or receiver unit in the pre-definable working region.

32. Rack serving device as claimed in claim 30, wherein the position detection system (74) can detect the location of the rack serving devices (1) in the working region and/or the position of the lift carriage (3) and/or load-bearing means (4).

33. Rack serving device as claimed in claim 1, wherein at least one image-processing element, in particular a CCD camera or a sensor system is assigned to the rack serving device (1), preferably in the region of the lift carriage (3) and/or the bogie assemblies (7, 8) and/or the displacement drives (13, 14).

34. Rack serving device as claimed in claim 1, wherein the lift carriage is guided on a guide track (54) on the mast (2), essentially without any clearance, by means of height and lateral guide elements (53) and the load-bearing means (4) is oriented perpendicular to the mast (2), and at least one sensor system (76) is provided in order to detect a deviation of the load-bearing means (4) from its horizontal orientation on the lift carriage or load-bearing means (4), and a control system is provided which detects the actual value and controls the horizontal orientation of the load-bearing means (4) by activating at least one displacement drive (13; 14).

35. Rack serving device as claimed in claim 34, wherein the ladder (68) can be docked in a position alongside the rack serving device (1) and releasably secured by means of mechanical and/or electrical and/or pneumatic and/or hydraulic locking elements disposed on it and on the rack serving device (1), or it is fixed in position relative to the runner rail (11; 12), for example, by locking means.

36. Rack serving device as claimed in claim 1, wherein a load (9) to be carried by the lift carriage (3) is detected by weight measuring elements, in particular a weighing cell, and a variable contact force of the drive rollers (37) and/or contact elements (36) of the displacement drives (13, 14) is adjusted and regulated via a control system by means of mechanically and/or electromechanically activatable actuators, such as a threaded spindle, and/or the inclination of the mast (2) can be set by varying the position of the displacement drives (13, 14) disposed one above the other depending on the torque acting on them.

37. Rack serving device as claimed in claim 1, wherein a ladder (68) can be displaced alongside it along at least one runner rail (11; 12) and guided in the height direction and to the side, for example for carrying out maintenance and/or repair work.

38. Rack serving device as claimed in claim 37, wherein the ladder (68) is length-adjustable.

39. Rack serving device as claimed in claim 37, wherein, in the standby position, the ladder (68) is disposed externally to a working area of the rack serving device (1) and is monitored in its end position by means of sensors disposed in the standby region.

40. Rack serving device as claimed in claim 37, wherein the ladder (68) has height and lateral guide rollers at its ladder foot and ladder head and at least one drive element preferably provided on the ladder foot and/or on the ladder head, and is guided on the guide rails (11, 12) and designed so that it can optionally be automatically displaced, in particular by means of the remotely operable drive element.

41. Rack serving unit, whereby several rack serving devices (1) disposed one after the other having height and/or lateral guide elements (20, 24) can be guided and displaced along guide tracks by means of at least one displacement drive (13, 14), the rack serving units (1) being linked to one another, wherein rack serving devices (1) are as claimed in claim 1.

42. Rack serving unit as claimed in claim 41, wherein the rack serving devices (1) spaced at a distance apart from one another in the aisle direction (15) are connected to one another, preferably releasably, by means of support frames (73) provided between the masts (2), in particular the mast feet (5) and mast heads (6) and the load-bearing means (4), which can be synchronously displaced, are directed towards one another and at least one of the rack serving devices (1) has at least one, preferably the top and/or bottom displacement drive (13, 14).

43. Rack serving unit as claimed in claim 41, wherein the rack serving devices (1) are held together at a pre-definable distance and/or can be displaced at a pre-definable distance from one another and a control system is provided for controlling this distance by controlling the displacement drives (13, 14) of the rack serving devices (1), and the displaceable load-bearing means (4) are directed away from one another.

44. Rack serving unit, in particular as claimed in claim 1, wherein the mast (2) is made up of two half-shell elongate sections (80) with a substantially C-shaped cross section and a width (81) of a base (82) of the C-shaped cross section is longer than a height (83) of legs (85) substantially perpendicular thereto, and these elongate sections (80) are joined to one another in a joint plane containing an axially parallel plane and a plane of longitudinal symmetry (88) of the mast (2), and/or the elongate sections (80) are positively assembled by a welded joint.

45. Rack serving unit as claimed in claim 44, wherein outwardly directed, substantially U-shaped protuberances (86) extending in the longitudinal direction of the mast (2) are formed with section strips (87) standing proud of the base (82) when the two elongate sections (80) are joined to one another to form a hollow section, and the section strips (87) form running surfaces (89) for running wheels (90) of the lift carriage (3) which can be guided and displaced on the mast (2), the two oppositely lying running surfaces (89) of every protuberance (86) extending parallel with one another and in planes perpendicular to the plane of longitudinal symmetry (88), and the running surfaces (89) of the oppositely lying protuberances (86) are aligned flush with one another.

46. Rack serving unit as claimed in claim 44, wherein each of the elongate sections (80) with a substantially cross-sectional shape has a substantially L-shaped projection (91) at its first free end, which have a first surface remote from the plane of longitudinal symmetry (88) as running surfaces (92) for the running wheels (90) of the lift carriage (3) displaced and guided on the mast (2) and another surface containing the plane of longitudinal symmetry (88) as support and/or joint surfaces (93), the two running surfaces (92) of the projections (91) extending parallel with one another and in a plane parallel with the plane of longitudinal symmetry (88).

47. Rack serving unit as claimed in claim 46, wherein the substantially L-shaped projections (91) have longitudinal edges (94) standing proud of their free ends forming the support and/or joint surfaces (93) substantially parallel with the plane of longitudinal symmetry (88), which form a hollow fillet for the weld seam (97) in the joint region (95) between the two butting adjacent elongate sections (80).

48. Rack serving unit as claimed in claim 44, wherein, at their other free ends lying opposite the projections (91), the legs (85) of the elongate sections (80) have longitudinal edges (94) forming support and/or joint surfaces (93) standing proud substantially parallel with the plane of longitudinal symmetry (88), which form a hollow fillet for the weld seam (97) in the other joint region (96) between the two butting adjacent elongate sections (80).

49. Rack serving unit as claimed in claim 44, wherein the joint along the hollow fillet between the elongate sections (80) is a weld seam (97) extending along the mast length.

50. Rack serving unit as claimed in claim 44, wherein the joint along the hollow fillet between the elongate sections (80) is provided in the form of several mutually spaced weld seams (97) applied intermittently along a part of the mast length.

51. Rack serving unit as claimed in claim 44, wherein the elongate section (80) has several slot-type cutouts (105) arranged one after the other in a row in its base (82).

52. Rack serving unit as claimed in claim 44, wherein an open side of the substantially U-shaped protuberances (86) directed towards the plane of longitudinal symmetry (88) is closed by at least one strip-shaped stiffening element (106) overlapping with the side regions adjoining the protuberances (86) and the stiffening elements (106) are joined to the elongate sections (80) by means of a welded joint.

53. Rack serving unit as claimed in claim 52, wherein the cross-sectional shape of the stiffening element (106) more or less corresponds to the cross-sectional shape of the protuberance (86).

54. Rack serving unit as claimed in claim 52, wherein the stiffening elements (106) extend along the entire mast length.

55. Rack serving unit as claimed in claim 52, wherein several stiffening elements (106) are disposed in the direction of the mast length, one after the other and separated from one another.

56. Rack serving unit as claimed in claim 52, wherein the stiffening element (106) has a first side edge (107) extending parallel with the legs (85) of the elongate section (80) and lying flat against them and another side edge (108) extending parallel with the base (82) of the elongate section (80) and lying flat against it, and, optionally, at least two positioning projections (109) at one of the side edges (107; 108) arranged at a distance apart from one another in the longitudinal direction of the stiffening element (106), parallel with the one section strip (87) and sitting flat against the latter.

57. Rack serving unit as claimed in claim 52, wherein connecting regions (106) are formed between the side edges (107, 108) of the at least one stiffening element (106) and the leg (85) as well as the base (82) and the stiffening element (106) is positively connected to the elongate section (80) in the connecting regions by means of a weld joint.

58. Rack serving unit as claimed in claim 52, wherein the joint between the at least one stiffening element (106) and the elongate section (80) is provided in the form of weld seams (97) extending continuously along the mast length at the side edges (107, 108) of the stiffening element (106).

59. Rack serving unit as claimed in claim 52, wherein the joint between the at least one stiffening element (106) and the elongate section (80) is provided in the form of several mutually spaced weld seams (97) extending intermittently along a part of the stiffening element (106) at the side edges (107, 108).

60. Rack serving unit as claimed in claim 44, wherein the L-shaped projections (91) are joined to one another to form a substantially U-shaped guide track 54*b* and an open side of the guide track (54*b*) directed towards the protuberances (86) is closed by at least one stiffening element (106) overlapping with the side regions adjoining the projections (91), and at least one stiffening element (106) is positively joined to the two legs (85) of the elongate sections (80) by a connecting element, e.g. a screw connection, welded joint.

61. Rack serving unit as claimed in claim 44, wherein the elongate sections (80) are of a symmetrical design and have a substantially constant wall thickness (102) throughout their cross section.

* * * * *